United States Patent
Richter

(10) Patent No.: US 8,527,324 B2
(45) Date of Patent: Sep. 3, 2013

(54) PREDICTIVE AND PROFILE LEARNING SALESPERSON PERFORMANCE SYSTEM AND METHOD

(75) Inventor: James Neal Richter, Belgrade, MT (US)

(73) Assignee: Oracle OTC Subsidiary LLC, Redwood Shores, CA (US)

( * ) Notice: Subject to any disclaimer, the term of this patent is extended or adjusted under 35 U.S.C. 154(b) by 1468 days.

(21) Appl. No.: 11/617,437

(22) Filed: Dec. 28, 2006

(65) Prior Publication Data
US 2008/0162487 A1 Jul. 3, 2008

(51) Int. Cl.
*G06Q 10/00* (2012.01)

(52) U.S. Cl.
USPC ........................................................ 705/7.38

(58) Field of Classification Search
USPC ........................................................ 705/7.38
See application file for complete search history.

(56) References Cited

U.S. PATENT DOCUMENTS

| | | | | |
|---|---|---|---|---|
| 5,127,063 | A * | 6/1992 | Nishiya et al. | 382/141 |
| 5,577,169 | A * | 11/1996 | Prezioso | 706/52 |
| 5,727,199 | A * | 3/1998 | Chen et al. | 1/1 |
| 6,049,797 | A * | 4/2000 | Guha et al. | 1/1 |
| 6,067,525 | A * | 5/2000 | Johnson et al. | 705/7.13 |
| 6,249,779 | B1 * | 6/2001 | Hitt | 706/1 |
| 6,665,648 | B2 * | 12/2003 | Brodersen et al. | 705/7 |
| 6,879,969 | B2 * | 4/2005 | Engstrom et al. | 706/20 |
| 6,978,249 | B1 * | 12/2005 | Beyer et al. | 705/10 |
| 7,015,911 | B2 * | 3/2006 | Shaughnessy et al. | 345/440 |
| 7,103,222 | B2 * | 9/2006 | Peker | 382/181 |
| 7,200,505 | B2 * | 4/2007 | Shan | 702/76 |
| 7,292,960 | B1 * | 11/2007 | Srinivasa et al. | 702/185 |
| 7,349,862 | B2 * | 3/2008 | Palmer et al. | 705/7.29 |
| 7,383,234 | B2 * | 6/2008 | Iyer et al. | 706/12 |
| 7,386,492 | B2 * | 6/2008 | Ginsburg et al. | 705/28 |
| 7,483,842 | B1 * | 1/2009 | Fung et al. | 705/7.14 |
| 7,512,626 | B2 * | 3/2009 | Chitgupakar et al. | 1/1 |
| 7,529,722 | B2 * | 5/2009 | Kofman et al. | 706/59 |
| 7,546,248 | B2 * | 6/2009 | Ellison et al. | 705/7.42 |
| 7,555,442 | B1 * | 6/2009 | Datta-Read et al. | 705/10 |
| 7,664,671 | B2 * | 2/2010 | Shan | 705/7.11 |
| 7,693,982 | B2 * | 4/2010 | Goldszmidt et al. | 709/224 |
| 7,729,931 | B1 * | 6/2010 | Tobin | 705/7.34 |
| 7,747,467 | B2 * | 6/2010 | Minakuchi | 705/26 |
| 7,769,622 | B2 * | 8/2010 | Reid et al. | 705/7.42 |
| 7,822,634 | B2 * | 10/2010 | McCall | 705/7.42 |

(Continued)

OTHER PUBLICATIONS

Walczak, Steven et al., Building Business Heuristics with Data-Mining Internet Agents Ninth Conference on Information Systems, 2003.*

(Continued)

*Primary Examiner* — Scott L Jarrett
(74) *Attorney, Agent, or Firm* — Kilpatrick Townsend & Stockton LLP

(57) ABSTRACT

A sales automation system and method, namely a system and method for scoring sales representative performance and forecasting future sales representative performance. These scoring and forecasting techniques can apply to a sales representative monitoring his own performance, comparing himself to others within the organization (or even between organizations using methods described in application), contemplating which job duties are falling behind and which are ahead of schedule, and numerous other related activities. Similarly, with the sales representative providing a full set of performance data, the system is in a position to aid a sales manager identify which sales representatives are behind others and why, as well as help with resource planning should requirements, such as quotas or staffing, change.

18 Claims, 21 Drawing Sheets

(56) References Cited

U.S. PATENT DOCUMENTS

| | | | |
|---|---|---|---|
| 7,930,314 B2* | 4/2011 | Gupta | 707/769 |
| 7,949,552 B2* | 5/2011 | Korenblit et al. | 705/7.13 |
| 8,095,447 B2* | 1/2012 | Stephens | 705/36 R |
| 2002/0077998 A1* | 6/2002 | Andrews et al. | 707/1 |
| 2002/0194148 A1* | 12/2002 | Billet et al. | 706/62 |
| 2002/0194329 A1* | 12/2002 | Alling | 709/224 |
| 2003/0187853 A1* | 10/2003 | Hensley et al. | 707/10 |
| 2003/0208394 A1* | 11/2003 | Burris et al. | 705/10 |
| 2004/0068431 A1* | 4/2004 | Smith et al. | 705/10 |
| 2005/0192831 A1* | 9/2005 | Ellison et al. | 705/1 |
| 2006/0116830 A1* | 6/2006 | Shan | 702/60 |
| 2006/0116920 A1* | 6/2006 | Shan | 705/10 |
| 2006/0116921 A1* | 6/2006 | Shan | 705/10 |
| 2006/0190318 A1* | 8/2006 | Downey et al. | 705/10 |
| 2008/0046264 A1* | 2/2008 | Rudnick | 705/1 |
| 2008/0103876 A1* | 5/2008 | Armstrong et al. | 705/10 |
| 2008/0208644 A1* | 8/2008 | Gray et al. | 705/7 |

OTHER PUBLICATIONS

Roberts, David R., Attribute Smoothing: A Pattern Forecasting Technique North Eastern SAS User's Group Conference, 1997.*

Sinha, Prabhakant et al., Sales Force Decision Models: Insight from 25 years of Implementation Interfaces, May/Jun. 2001, vol. 31, No. 3.*

Kuo, R.J. et al., A sales forecasting system based on fuzzy nueral network with initial wieghts generated by genetic algorithm European Journal of Operations Research, vol. 129, 2001.*

Bose, Indranil et al., Business data mining—a machne learning perspective Information & Management, vol. 39, 2001.*

Lee, Youn Jun, An automated knowledge extraction system University of Minesota, 1994.*

Ishibuchi, Hisao et al., Fuzy Data Mining by Heuristics Rule Extraction and Multiobjective Genetic Rule Extraction 2006 IEEE International Conference on Fuzzy Systems, 2006.*

Ishibuchi, Hisao et al., Heuristic Extraction of Fuzzy Classification Rules Using Data Mining Techniques IEEE, 2004.*

Sarker, Ruhul A. et al., Heuristics & optmization for knowledge discovery IDEA Group Publishing, 2002.*

Chen, Shiulon, D4—An Integrated Architecture of Data Mining, Data Warehouse, Distributed Databases and Distriuted Computing, the University of Mississippi, May 1997.*

Walczak, Steven et al., Building Business Heuristics with Data mining Internet Agents Ninth Conference on Information Systems, 2003.*

Machine Learning definition Retrieved from Wikipedia.org, Sep. 27, 2012.*

SymphonyRPM Announces Ease-of-Use Features B-eye-network. com, Nov. 1, 2005, Retreived from Arhive.org Jun. 17, 2011.*

SymphonyRPM: Your Partner in Performance Management SymphonyRPM, Inc., 2004.*

SymphonyRPM: The SymphonyROM Peformance Management Platform SynphonyRPM, Inc. 2004.*

Laske, Otto, Pro-Active Performance Management: How to Glen Intelligence from Predictive Analytics Laske and Associates, LLC, 2002.*

Capillow, Joe, Sales Performance Accountability Furniture World Magazine, Jul. 1, 1998.*

Gillis, Marge et al., The Ideal Rep Pharmacutical Executive, vol. 20, No. 12, Dec. 2000.*

Coen, Dan, Creating a dynamic performance development program Direct Marketing, vol. 64, No. 23, Jul. 2001.*

Shifting the Performance Curve: Exporting High-Performance Sales Discipline to the Core Corporate Executing Board, Sales Executive Council, 2003.*

Prudencio, Ricardo B.C. et al., Meta-learning approaches to selecting time series models Nerocomputing, vol. 61, 2004.*

Heckerman, David, Bayesian Networks for Data Mining Data Mining and Discovery, 1997.*

Siebel Sales User Guide—MidMarket Edition—Version 7.5 Siebel, Sep. 2002.*

Bunn, Derek et al., Setting Accuracy Targets for Short-Term Judgemental Sales Forecasting International Journal of Forecasting, vol. 17, 2001.*

Vavricka, Joe et al., Implementing Formal Selling Process and Performance Measures in a Sales Organization Trailer Vavricka Inc., 1997.*

Advanced Pipeline Analysis—VisualSmart Analytics Synergex, 2003.*

Sales Analytics for Sales Productivity—Driving Sales in a Down Economy Business Objects, 2003.*

Siebel Analytics Enterprise Applications User Guide—Version 7.7.2 Siebel, Sep. 2004.*

Wu, Shaomin et al., A score AUC Metric Classifer Evaluation and Selection Proceedings of ICML 2005 Workshop on ROC Analysis in Machine Learning, 2005.*

Arinze, Omega B., Selecting appropriate forecasting models using rule induction Pergamaon Press Inc., Nov. 1994, Abstract.*

Chen, Guoqing et al., Discover Similar Time-Series Patterns with Fuzzy Clustering and DTW Methods IEEE, 2001.*

* cited by examiner

PREDICTIVE AND PROFILE LEARNING SALESPERSON PERFORMANCE SYSTEM AND METHOD

BACKGROUND

1. Field

This application relates generally to sales automation and forecasting systems and, more particularly, to tracking and storing sales data for performance prediction.

2. Background

Sales automation systems are common in the art. In standard usage, these systems aid a sales representative, a sales manager, or both, to be more efficient at selling a product or service. Sales forecasting analytics are commonly a component of a sales automation systems, and are largely focused towards the sales manager to help forecast and manage the sales process.

A sales automation system is generally a tool that allows sales representatives and managers to organize contact records, as well as manage records associated with sales quotes and invoices. It can also work in the context of a 'Sales Methodology' where the sales process is structured around the representative working though a set of stages in an attempt to complete a sale. Sales automation tools typically allow the tracking of such records in terms of time periods associated with fiscal or financial accounting. During these 'sale periods' it is important for sales representatives and managers to have analytical reports defining progress towards various goals.

Typically the sales representative recognizes the benefit of using a sales automation system for maintaining their list of contacts, but most other tasks are considered overhead with little benefit. Thus, sales automation systems commonly suffer from a lack of full acceptance by the sales staff, which limits their usefulness to the sales managers as well—if the sales representative doesn't utilize the system then the manager does not have a full picture of the sales process. As the sales representative is responsible for using the system to track individual deal progress through the sales stage, should they fail to log the sales progress the system is left without the valuable data necessary for the sales manager to forecast and manage the sales goals. A system that provides incentive to a sales representative to use features beyond a contact management system is needed. Additionally, in part because of the lack of sales data and in part because of the prior state of the art, many analytics used by the sales manager are quite simple models with manual parameters based upon the sales manager's intuitions about prior performance.

Many algorithms in the general field of data mining provide resources to a knowledgeable individual for extracting relevant information from large amounts of data. There exist data mining applications to aid in this process. In some instances there are data mining approaches incorporated into other systems, such as sales automation systems. These incorporated techniques are usually quite rudimentary compared to the full suite of techniques available in a complete data mining system, yet still require some level of sophistication on the part of the user (in sales automation systems the user would be the sales manager). Some of the more advanced techniques available would be standard statistical approaches for assigning error bars or applying a linear regression analysis. These statistical approaches are often guided by or overridden with ad-hoc scaling factors based upon the sales manager's intuition, such as: "Bob usually over promises his amount sold by about 25%, yet Sue is more conservative and usually under promises by 15%. Therefore I will adjust Bob's sales predictions down by 25%, but increase Sue's predictions by 15%."

There exist new data mining and machine learning techniques which can go beyond the traditional analyses, above, but they require data to work accurately to overcome the ad-hoc manual scaling factors. To collect this data the sales representative must be motivated to provide the information. Stereotypically, sales people are motivated by two goals: meeting personal monetary targets, and out performing their peers. Methods that target these motivations are needed and will increase the acceptance of a sales automation system by the sales people, and hence provide a richer set of useful data to the sales manager. Most prior systems have failed to adequately provide features found compelling to the sales representative, and have overlooked the connection that the sales manager's job is best done with the full data available from an engaged sales representative. Some prior systems have recognized the benefits of catering to the interests of a sales representative, but have neglected to use the data naturally collected by the sales automation system to reflect back and help provide the necessary feedback to keep the system accurately tuned—commonly the systems relied on a manual configuration of the various parameters.

A better sales automation and forecasting management system is needed to address the above noted shortcomings in the prior art.

SUMMARY

One aspect of the inventive subject matter includes a sales automation system and a method for scoring sales representative performance and forecasting future sales representative performance. These scoring and forecasting techniques can apply to a sales representative monitoring his own performance, comparing himself to others within the organization (or even between organizations using methods described in application), contemplating which job duties are falling behind and which are ahead of schedule, and numerous other related activities. Similarly, with the sales representative providing a full set of performance data, the system is in a position to aid a sales manager identify which sales representatives are behind others and why, as well as help with resource planning should requirements, such as quotas or staffing, change.

Further aspects include a central repository of logged sales related data including data representative of the progress made through the various sales stages of the sale cycle. The logged sales data is extracted to support the learning forecasting and prediction functions of the present invention. Numerical and quantitative data records can be retrieved based on user request for data. Still further aspects include an incentive because of the ability to provide a sales representative through a user interface current and predictive analysis of their performance relative to their peers and groups of other sales representatives. Some embodiments also provide a tool that allows the sales representative and manager to perform a predictive analysis of their conversion rate to monitor monetary performance.

For example, all calculations can be done to score the performance of individual people and groups with respect to learned data models of top performing sales people as well as with respect to user-entered ideal models of performance. An example of this would be an ideal revenue growth of a sales person over time. A second example is a relative analysis of the person's ongoing sales 'pipeline' with respect to learned and ideal models of good performance. In either case the system can learn the historical sales models for an individual or high performing sales representative using any of a variety of machine learning techniques. In addition, an idealized model can be entered by the sales manager. The resulting comparison can aid in the understanding of how individuals relate to one another and to an idealized individual. This helps sales representatives understand their relative performance, and it helps sales managers understand if there is a general deviation between their idealized model and the actual performance of an individual or group.

Another example can be evaluating an entire sales process sales methodology with respect to the ideal model of the process as well as compared to other good performing processes or methodologies. Note that this analysis can be independent of individuals looking at the process in isolation. It can also be used to identify weak individuals or groups that bring the overall performance of the process or methodology down. One aspect of the embodiments is the ability to use the systems and methods in CRM software applied to sales process analysis and its combination with iterative machine learning methods.

With the historical performance of each sales representative stored by the sales automation system, the system can more accurately update the forecasting portion of the sales analytics.

These and other advantageous features of the various embodiments will be in part apparent and in part pointed out herein below.

BRIEF DESCRIPTION OF THE DRAWINGS

For a better understanding of the present invention, reference may be made to the accompanying drawings in which:

FIG. 7 is an illustration of the Ideal Growth Analysis;

INCORPORATION BY REFERENCE

Figure 1:
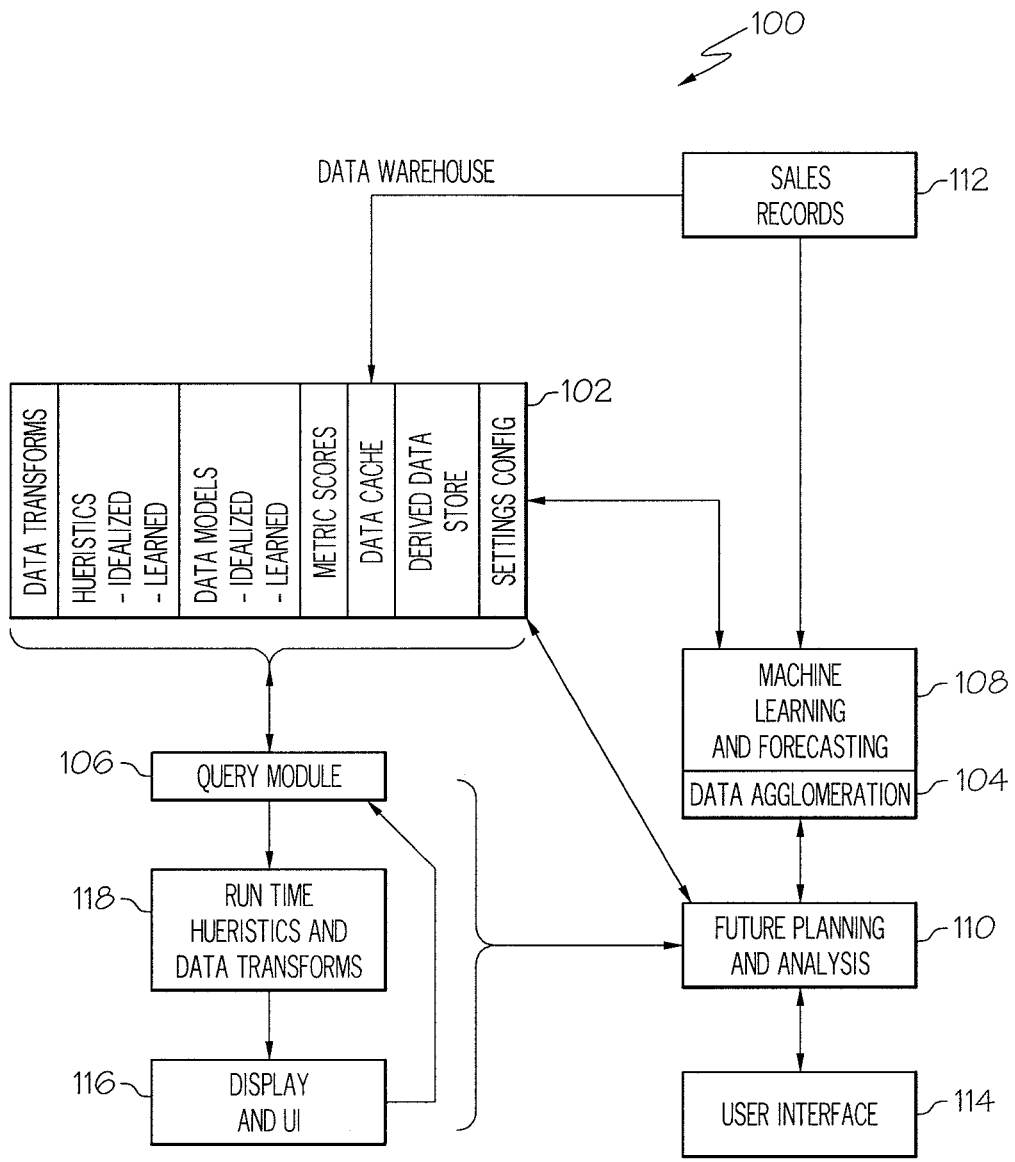
FIG. 1 is a top level diagram of the system architecture.

An addition to the disclosure herein relative to the subject matters A-D reference is to be made to the publications listed below:

(A) Queuing Models/Systems:

An Introduction to Stochastic Modeling by Samuel Karlin, Howard M. Taylor Academic Press; 3 edition (February 1998) (hereby incorporated by reference for all purposes)

(B) Machine Learning & Data Mining

Pattern Recognition, Third Edition by Sergios Theodoridis, Konstantinos Koutroumbas; Academic Press; 3 edition (Feb. 24, 2006) (hereby incorporated by reference for all purposes)

Pattern Classification (2nd Edition) by Richard O. Duda, Peter E. Hart, David G. Stork; Wiley-Interscience; 2nd edition (October 2000) (hereby incorporated by reference for all purposes)

Machine Learning by Tom M. Mitchell; McGraw-Hill Science/Engineering/Math; 1 edition (Mar. 1, 1997) (hereby incorporated by reference for all purposes)

(C) Forecasting and Prediction:

Forecasting: Methods and Applications by Spyros G. Makridakis, Steven C. Wheelwright, Rob J Hyndman; Wiley; 3 edition (December 1997) (hereby incorporated by reference for all purposes)

(D) Sales/Business:

Selling and Sales Management by Robert D. Hirsch, Ralph Jackson; Barron's Educational Series (Sep. 29, 1993) (hereby incorporated by reference for all purposes)

DEFINITION OF TERMS

Sales Strategy: A sales methodology where the process of selling is organized around a set of abstract 'stages', where at each stage the sales person and/or potential customer perform a set of tasks.

Sales Pipeline: A set of potential sales transactions (deals) for a sales person or group in various stages of completion.

Sales Funnel: A standard visual picture of a sales pipeline.

Sales Period: A specific time period when sales activity is conducted and measured.

Sales Quota: A revenue goal for a particular sales person or group of people for a specific 'sales period'.

Top Performer: A sales person who meets a set of user/system defined performance metrics for a set of sales periods.

Data Agglomeration: The process of grouping a set of raw data points by a particular attribute along with a particular mathematical operator.

DETAILED DESCRIPTION OF INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. Also, please note that the first digit(s) of the reference number for a given item or part of the invention should correspond to the Fig. number in which the item or part is first identified.

The description of the various embodiments is to be construed as exemplary only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

One embodiment of the present invention comprising a central repository of logged sales related data; a machine learning module and a prediction module teaches a novel system and method for sales performance and forecasting.

For simplicity and illustrative purposes, the principles of the present invention are described by referring mainly to an exemplar embodiment, particularly, with references to the Internet and the World Wide Web (WWW) as the exemplary databases of informational items. However, one of ordinary skill in the art would readily recognize that the same principles are equally applicable to, and can be implemented in, other informational database, and that any such variation would be within such modifications that do not depart from the true spirit and scope of the present invention. Similarly, simplicity of description for the present invention makes use of a data warehouse. However, one of ordinary skill in the art would readily recognize that the same functionality can be gained in the absence of a data warehouse through summarized data, simulated data, data models or the like and not depart from the true spirit and scope of the present invention.

FIG. 1 illustrates a representative architecture 100 according to embodiments of the invention. The details of the various embodiments can be better understood by referring to the figures of the drawings. The data warehouse (DW) 102 is the central repository for the supporting the machine learning and forecasting (MLF) 108 and future planning (FP) 110 modules. While those of ordinary skill in the art could readily identify different sets or subsets of elements, for explanatory purposes in the embodiments of the present invention the following elements are described as part of a data warehouse:

Data Transforms—data
Heuristics {Idealized and Learned}—using an Idealized or Learned set of rules or replicable method or approach for directing attention to data key to prediction and forecasting
Data Models {Idealized and Learned}—using data models using idealized or learning information
Derived Data Store
Data Cache
Metrics and Scores—related to sales goods
Stored Scenarios—fabricated sales conditions
Configuration Settings—

One aspect of the DW 102 of the various embodiments is that nearly all elements may have an associated timestamp. One of ordinary skill in the art can clearly see that the DW 102 can be maintained in a database, in working memory, on disk, or by innumerable other means. Similarly, the DW 102 may contain original data, summarized data, machine learned data, or manually configured data. Referring to FIG. 1, the DW 102 is shown having the various elements listed above. The Data Agglomeration 104 is shown communicably linked to the DW 102 for retrieving and caching records. The Query Module 106 for initiating user queries and displaying is shown communicably linked to the DW. The machine learning module 108 and future planning module 110 is shown communicably linked to DW 102 and Data agglomeration 104. The DW 102 includes sales data generated from raw sales data manipulated by the MLF 108 and FP 110 to generate learned data based on historical data, and includes idealized data based on benchmarked models or user input or idealized data formulated from data operated on by heuristic rules/algorithms. A display and user interface 116 may be used to access DW 102. Data provided through user interface 116 may be transformed using run time heuristics and data transforms 118. Additionally a user interface 114 may be used to provide input and receive output from FP 110.

Figure 2:
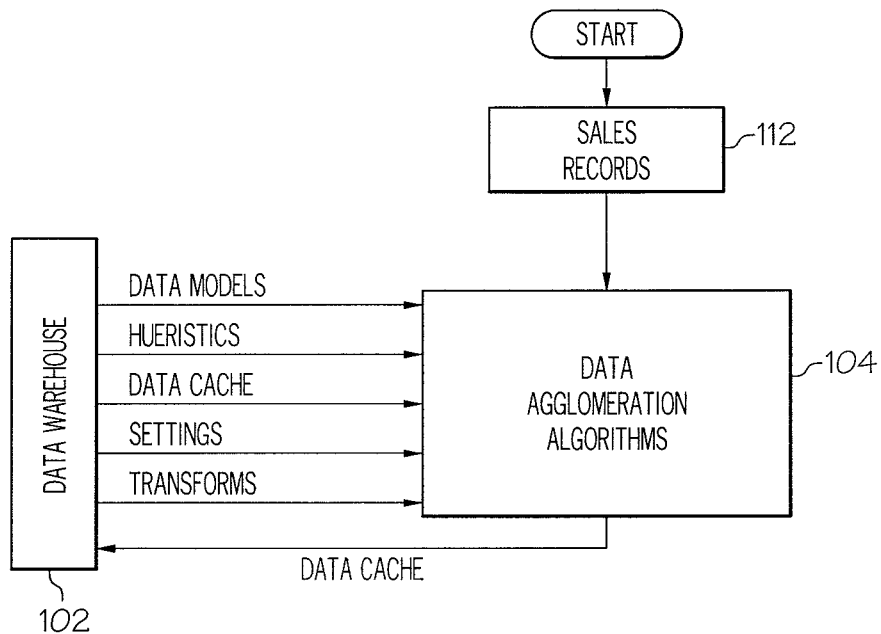
FIG. 2 is an illustration of the data agglomeration of the respective elements of the central repository.

FIG. 2 is an illustration of the operation of data agglomeration module 104 according to embodiments of the invention. The Data Agglomeration Module 104 associated with the DW 102 retrieves snapshots of raw sales records/transactions 112 and transcribes the numerical and quantitative data of the records with an attached timestamp at regular intervals. In addition, the records 112 may be accumulated per sales representative and per that representative's management hierarchy. During this process a number of calculations can be made, including but not limited to, standard 'sales metrics' like the percentage of a representative's (or group of representatives') sales quota they have attained as of a given date. A data cache and metric score calculated by the Data Agglomeration can be stored back on the DW 102.

One task of data agglomeration module 104 is to retrieve sales records (sales transactions) 112 and cache a subset of those records, the quantitative data, with a timestamp. The module also can cache data using data transformations as well as using data models, and heuristics in combination with previous data caches to produce various sales metrics. One of ordinary skill in the art can easily determine that the Data Agglomeration module 104 could be performed in a number of different ways and similarly that the scope of the inventive subject matter would not be diminished by not using this module. Rather the inclusion of this module is an efficiency enhancement to the novel aspects of the current invention. Similarly, the caching and agglomeration can occur in memory, on disk, or in any other method which should be obvious to one of ordinary skill in the art.

Figure 3:
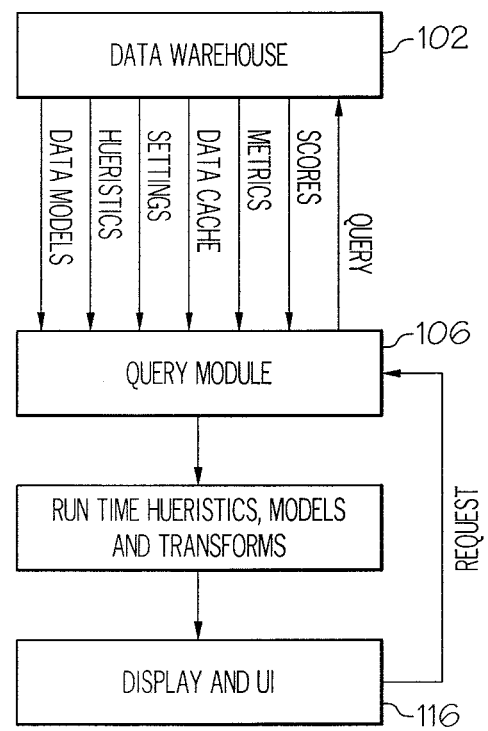
FIG. 3 is an illustration of a data query module according to embodiments of the invention.

FIG. 3 is an illustration of a data query module 106 according to embodiments of the invention. The Query Module 106, also referred to as a Data Query and Display Module (DQ-DM) associated with the DW 102 allows the user initiation of queries and displays the quantitative data graphically in combination with a user's group and other peer groups. Each metric has a customizable graphical display and custom metrics can be created for display. These graphical metrics can be combined with other graphical and tabular data to create a 'dashboard' for sales people.

The basic data flow is driven by a user request for data via display and user interface 116. A query is generated, and the response data is sent to the query module 106 in combinations with various other elements of the DW 102. Next, the data and elements move to the run-time engine where transforms, heuristics and data models 118 are applied. The resulting retrieved and calculated data is then provided to display components of display and user interface 116 for viewing by the user.

Figure 4:
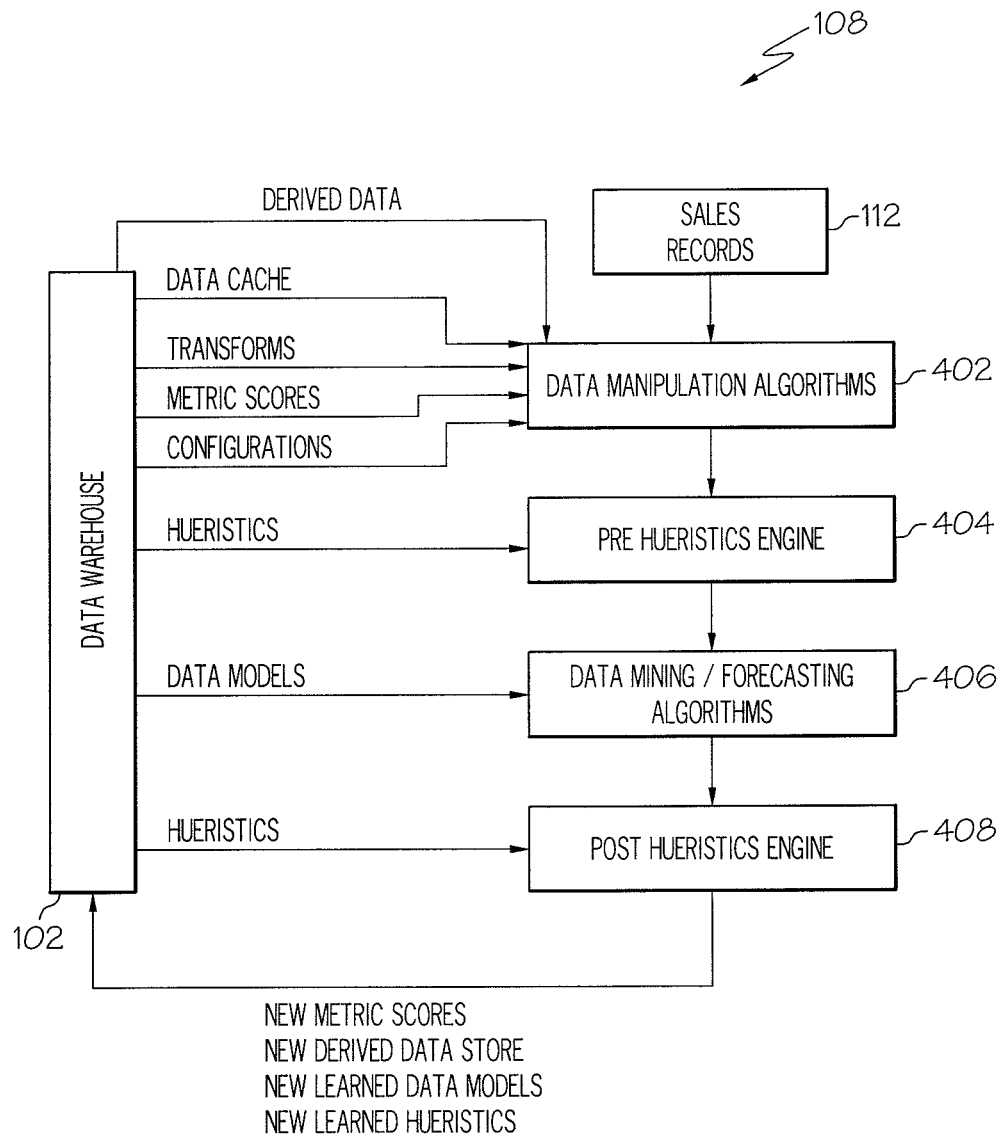
FIG. 4 is a machine learning and forecasting functional flow according to embodiments of the invention.

FIG. 4 is a machine learning and forecasting functional flow according to embodiments of the invention. The machine learning and forecasting (MLF) module 108 associated with the DW 102 is a data mining module used within embodiments of the present invention. It takes input from the various sales data tables 112, user input heuristics, and user input idealized data models. The output is generally various scores on each metric or combinations of metric as well as learned data models.

The MLF module 108 is comprised of a variety of components. Each component contains a collection of algorithms that can be applied both in parallel and sequentially to produce output within a component. The following components are useful in the preferred embodiment, but one with ordinary skill in the art can easily see that not all of the components are necessary, for example, either or both of the heuristics engines 404 and 408 could be eliminated without altering the intended functionality of the current invention.

MLF:
  Data Manipulation Algorithms (DMA) 402 (further described in FIG. 12)
  Pre-DMF Heuristics Engine (HE1) 404 (further described in FIG. 14)
  Data Mining and Forecasting Algorithms (DMF) 406 (further described in FIG. 13)
  Post-DMF Heuristics Engine (HE2) 408 (further described in FIG. 14)

The process flow illustrated in FIG. 4 is as follows:
1. Sales records 112 and elements of the DW 102 are retrieved and input to the DMA 402 which is a component of MLF 108. The configuration settings specify what algorithms are applied in combination with DW 102 elements.
2. The output of the DMA 402 is passed to HE1 404 which is also a component of MLF 108 along with retrieved heuristics from the DW. Various heuristics specified by the configuration settings are applied to the input.
3. The output of HE1 404 is passed to DMF 406 where configuration settings govern the algorithms used in what combination with DW 102 elements.
4. The output of the DMF 406 is passed to the HE2 408. Internals proceed similar to step 2.
5. The output of the HE2 408 is sent to the DW 102. The output may be some combination metric-scores, derived data store, learned data models and learned heuristics.

Figure 5:
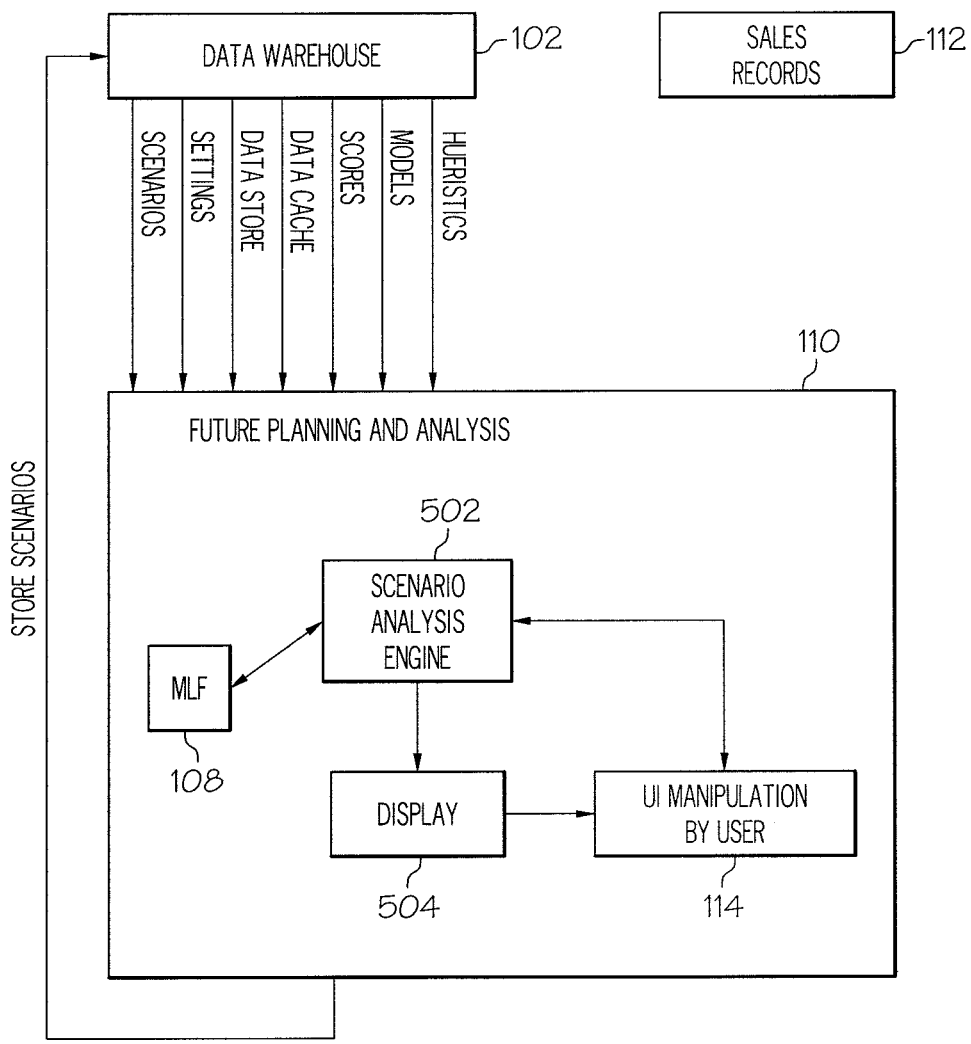
FIG. 5 is a future planning module functional flow according to embodiments of the invention.

FIG. 5 is a future planning module functional flow according to embodiments of the invention. The Future Planning and Analysis module (FPA) 110 illustrated in FIG. 5 allows users to play out future scenarios and use learned and idealized models as well as current and past data to execute these scenarios. The FPA 110 module builds upon previous modules capabilities and includes a scenario analysis engine 502 that adds the ability to store and retrieve 'scenarios' and execute these scenarios in isolation in addition to changing base data and model values for a particular scenario. Scenario analysis engine 502 interacts with MLF 108 based on input received from a user interface 114. The results of the scenario may be displayed 504 via user interface 114.

Examples 6 and 7 discussed below provide example use cases of the FPA 110.

Figure 6:
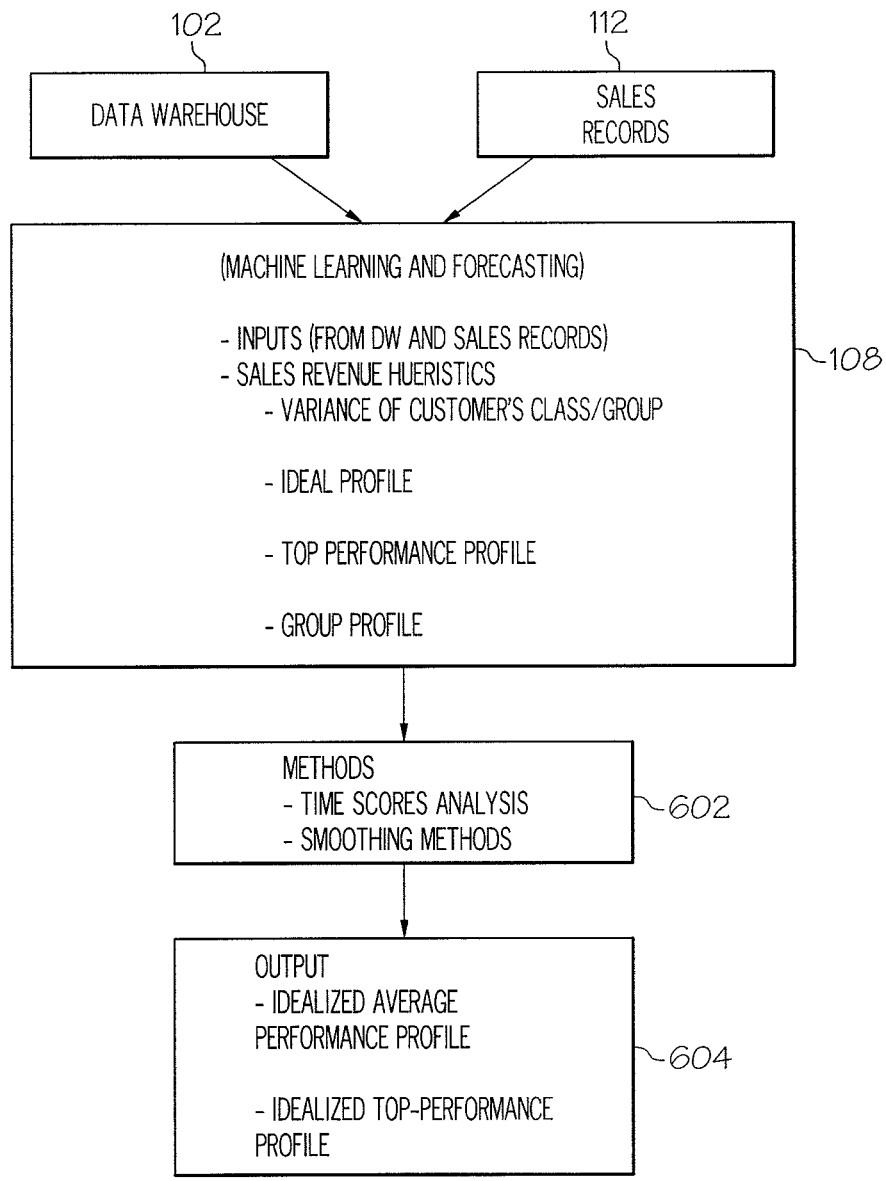
FIGS. 6 and 7 are diagrams illustrating the revenue growth MLF examples.
Figure 7:
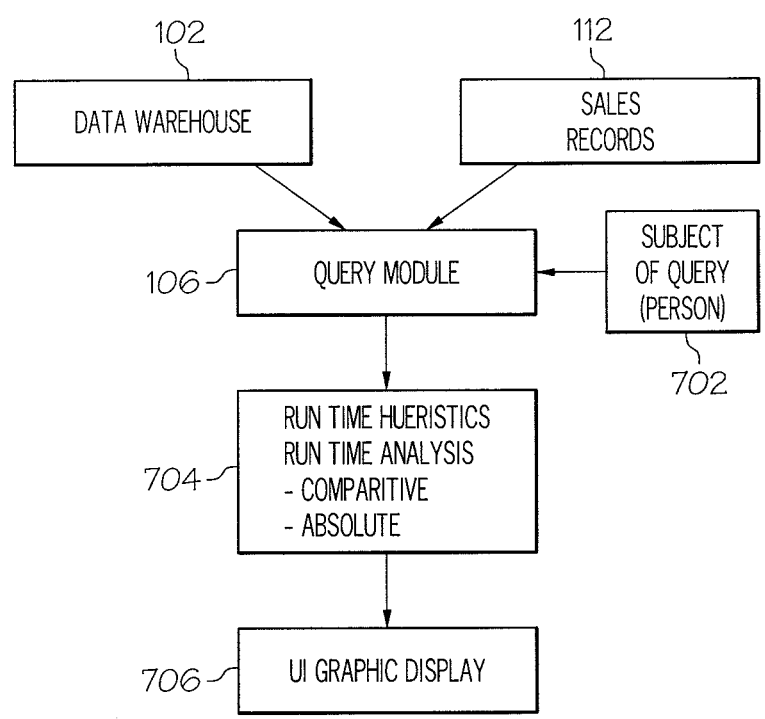
Figure 8:
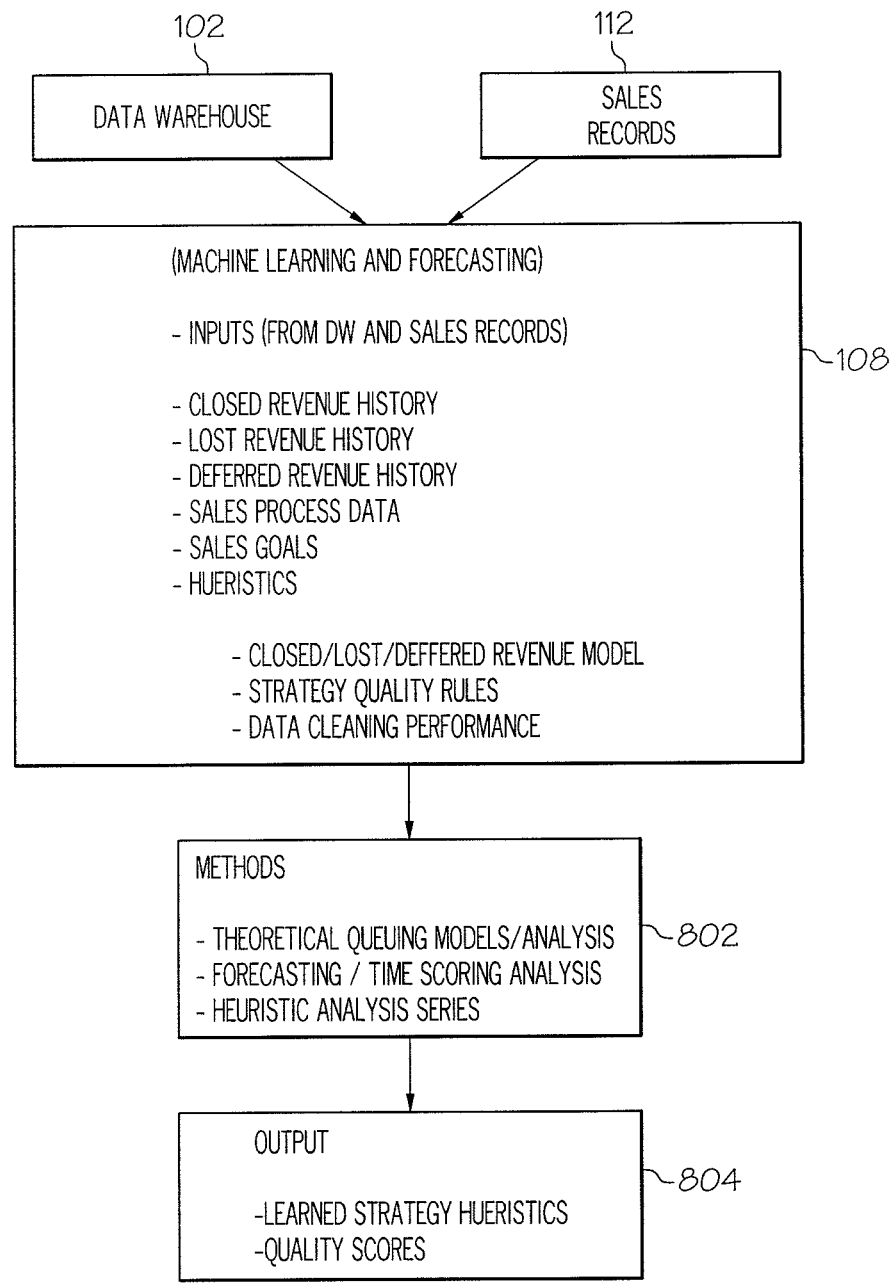
FIG. 8 is an illustration of the Ideal Pipeline or Strategic analysis.

FIGS. 6 and 7 are diagrams illustrating the revenue growth MLF examples. The MLF module 108 is used to do the main data analysis of the FPA 110. The module is supplied with previous inputs from the data warehouse 102 and sales records 112 as well as any 'stored scenarios' in the DW. The User interface 116 of the FPA module 110 allows the user to manipulate any data point that has been loaded from the DW 102 as well as change parameters of the various 'models' used in the MLF module 108. The changes entered by the UI are updated into the MLF via the 'Scenario Analysis Engine' 502, a sub-component of the FPA 110 that is shown in FIG. 5.

In addition to accepting data and model changes from the UI, the 'Scenario Analysis Engine' 502 contains a specific script, or algorithm, that specifies what components of the MLF 108 are used and in what sequence to produce a desired output analysis 604. Various analytical methods 602, such as time series analysis or smoothing methods may be applied. Output analysis 604 may include an idealized average performance profile or and idealized top-performance profile.

FIGS. 1-9 have illustrated various aspects of the system and system operation. Further details on the operation of the system are provided below in FIGS. 15-19. As noted above, MLF 108 may use various algorithms during its operation. Further details on these algorithms are provided in FIGS. 12-14.

Figure 12:
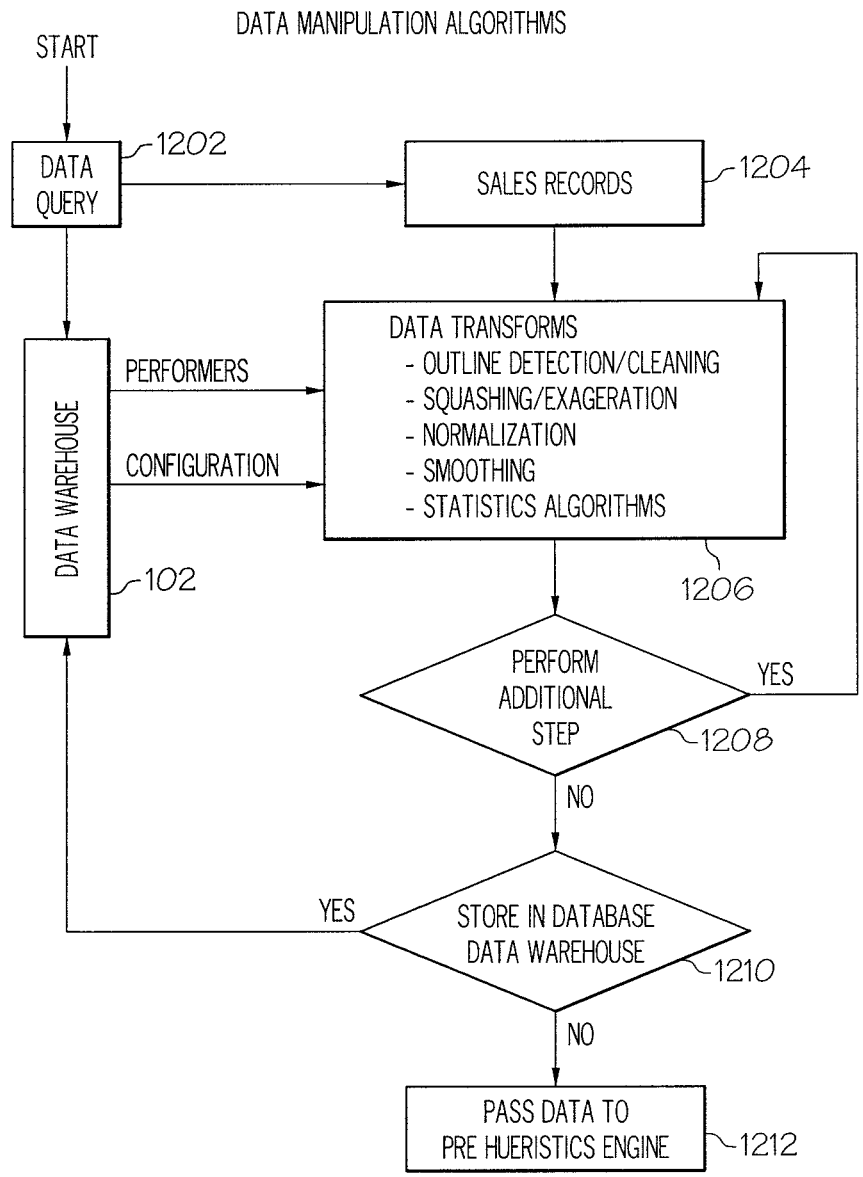
FIG. 12 is a diagram of the Data Manipulation Algorithm (DMA)

FIG. 12 provides further details regarding data manipulation algorithms 402. The Transforms section 1206 lists several example transforms which may apply in some embodiments. One of ordinary skill in the art can recognize that this set of examples is representative and not exhaustive. Similarly, this step might use any number or combination of these transforms without altering the scope or intent of this patent.

Figure 13:
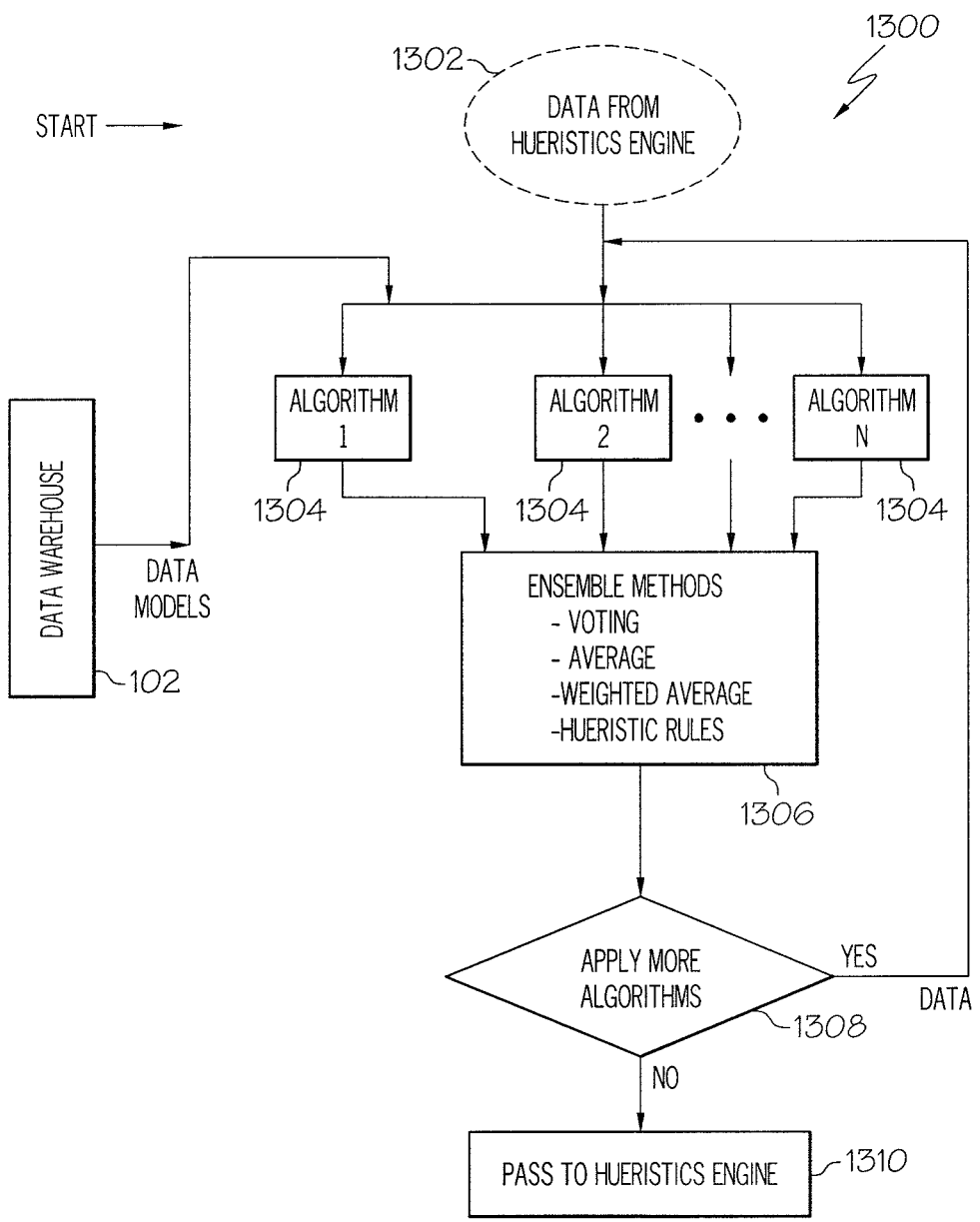
FIG. 13 is a diagram of the DMF flow.

FIG. 13 is a flow chart of the Data Mining and Forecasting Algorithms. Example Algorithms 1306 for FIG. 13 include, but are not limited to the following:
  Bayesian Classsifier
  Perceptron Algorithm
  Expectation Maximization
  K Nearest Neighbor
  Radial Basis Function Networks
  Relaxation Discriminate Classification
  Divisive Clustering Algorithms
  Agglomerative Clustering Algorithms
  Ho-Kashyap Procedures Linear Programming
Moving Average Forecasting (Family of Algorithms)
Box-Jenkins Forecasting
Holt-Winters Seasonality Forecasting
Wavelet Forecasting
Iterative Optimization Algorithms
Evolutionary Optimization Algorithms
Theoretical Queuing Models In FIG. 13, the list of Algorithms 1304 (1 through N) represents any combination of data mining and forecasting algorithms. The system may use a single algorithm or any number of multiple algorithms in conjunction. These algorithms could include any commonly known data mining algorithms such as clustering, outlier detection, linear regression, or any other technique known to someone with ordinary skill in the art. The section labeled "Ensemble Methods" 1306 lists several techniques used to resolve the combination of the data mining algorithms. One of ordinary skill in the art can recognize that this list is non-exhaustive and that any of the listed approaches alone or in combination could be used to achieve the desired purpose.

Figure 14:
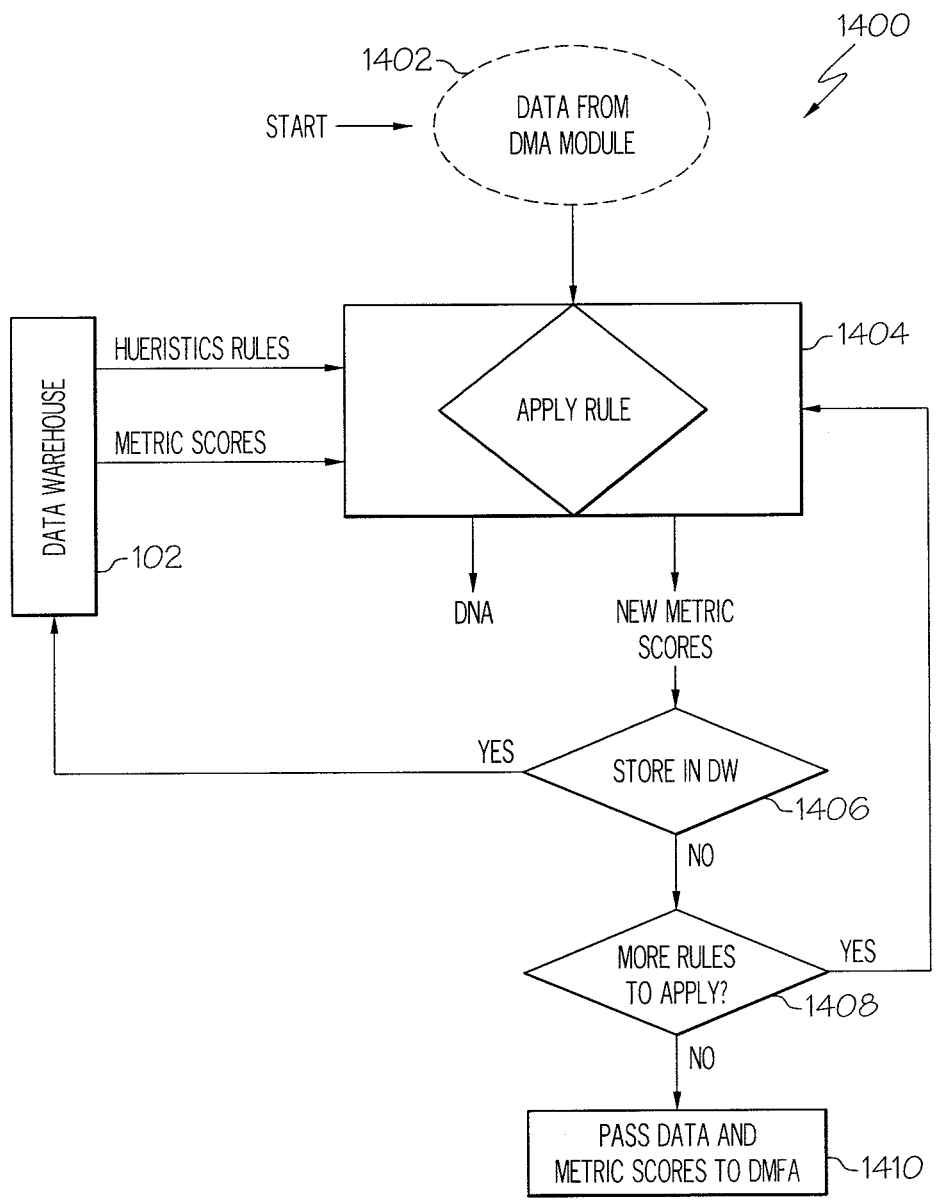
FIG. 14 is a diagram of the Post-DMF Heuristics algorithm.

In FIG. 14, the section labeled "Apply Rule" 1404 represents any type of rule that would be available in a rules engine or expert system, as known by one of ordinary skill in the art. Examples include, "Deal takes longer than 30 days AND deal size >$10,000" or "Quota attainment >50%" or "Sales funnel stage <3" or "Sales person progress score >B+" or any other construction that proves useful to aiding the sales process.

FIGS. 15-19 are flowcharts illustrating methods according to various embodiments of the invention. The methods to be performed by the embodiments may constitute computer programs made up of computer-executable instructions. Describing the methods by reference to a flowchart enables one skilled in the art to develop such programs including such instructions to carry out the method on suitable processors (the processor or processors of the computer executing the instructions from computer-readable media such as ROM, RAM, CD-ROM, DVD-ROM, flash memories, hard drives and other media). The methods illustrated in FIGS. 15-19 are inclusive of acts that may be taken by an operating environment executing one or more exemplary embodiments of the invention.

Figure 15A:
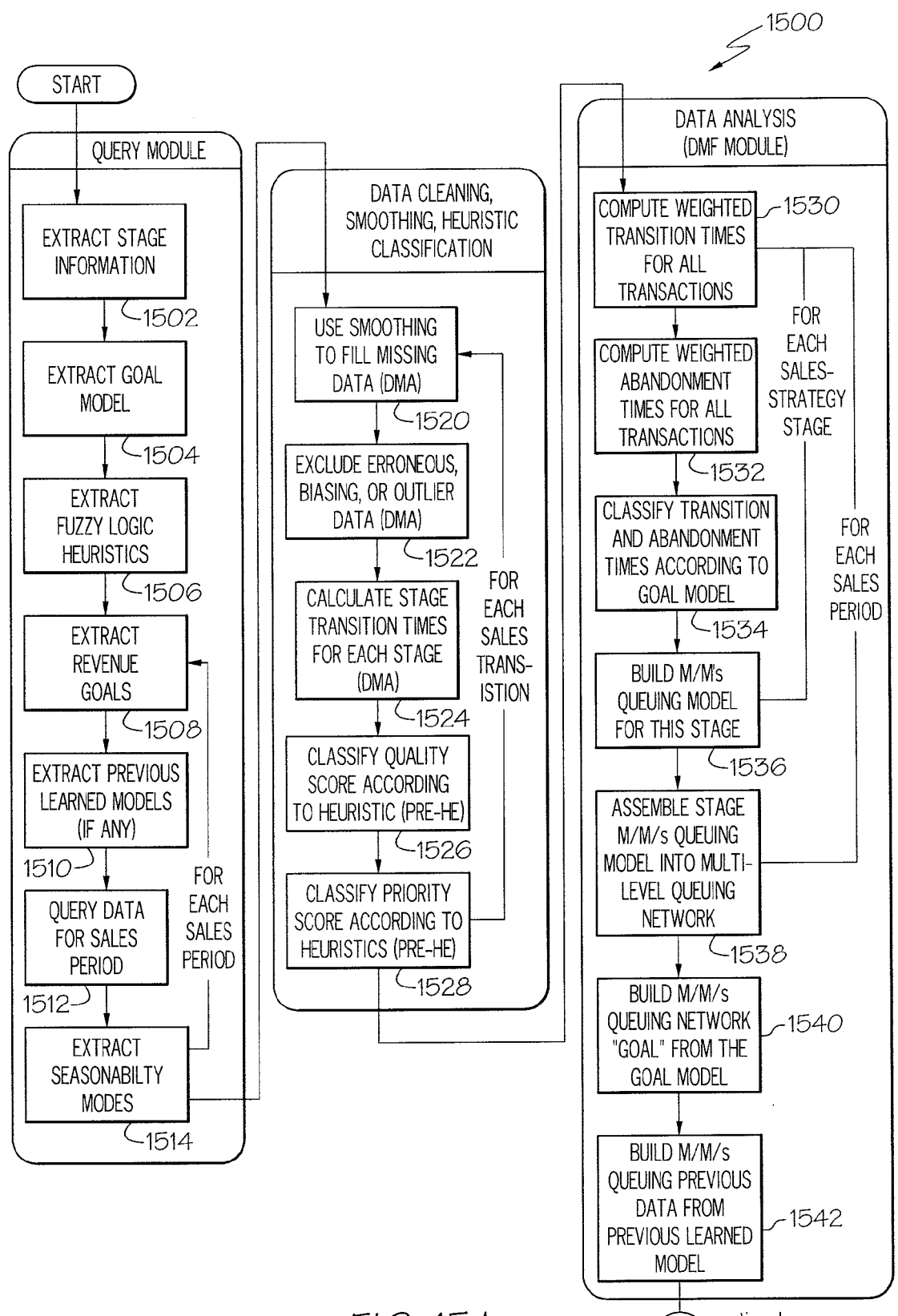
FIGS. 15A and 15B are a flowchart illustrating a Pipeline Analysis method according to embodiments of the invention.
Figure 15B:
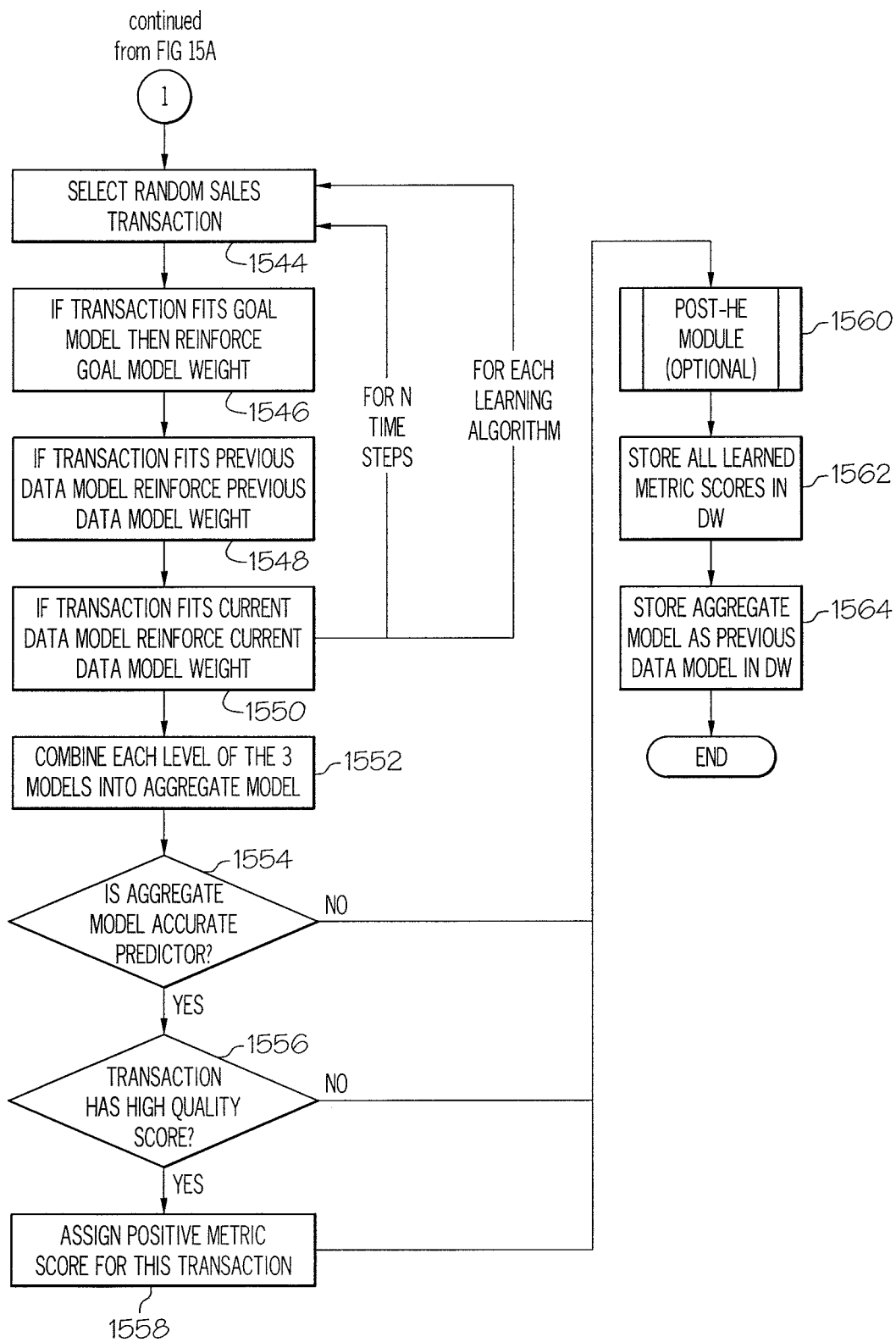

FIGS. 15A and 15B are a flowchart illustrating a Pipeline Analysis method according to embodiments of the invention. Although the example method includes details regarding how the modules interact with each other to provide a specific analysis in particular embodiments, it should be noted that operations in the method may be performed by different modules in various alternative embodiments.

In some embodiments, the method used input data comprising a list of sales periods to analyze and a sales strategy to analyze. The method at begins at block 1502 by extracting stage descriptive information from data warehouse 102 for the input sales strategy. At block 1504, a goal model for a given sales-strategy, sales-period pair is extracted. At block 1506, fuzzy logic quality and priority heuristics for the given sales-strategy and period are extracted.

One or more of the actions in blocks 1508-1514 may be executed for each sales period. At block 1508, revenue goals for the given sales period are extracted. At block 1510, previous learned sales period models for the given sales strategy, if any, are extracted from data warehouse 102. At block 1512, the data warehouse 102 is queried for sales transaction data for the given sales period. In some embodiments, the sales transaction data may include ongoing, closed, lost or deferred transactions. At block 1514, a seasonality model for the given sales period is extracted from the data warehouse.

The actions in blocks 1520-1528 may be executed for each sales transaction obtained at block 1512 in order to perform data cleaning, data smoothing and/or heuristic classification. At block 1520, a smoothing method may be used to fill in missing data. At block 1522, erroneous or biasing data points may be determined and excluded. At block 1524, sales strategy stage transition times are calculated for each stage. In some embodiments, the DMA module performs the smoothing, exclusion of erroneous or biasing data points and/or calculation of the sales strategy transition times.

At block 1526, a quality score is classified according to a quality heuristic. At block 1528, a priority score is classified according to a priority heuristic. In some embodiments, the quality score and the priority score may be classified by a Pre-HE module.

The actions in blocks 1530-1538 may be part of a loop that is executed for each sales period in the input sales period list. Further, block 1530-1536 may be part of a loop that is executed for each sales strategy stage. At block 1530, weighted transition times for all sales transaction are computed. At block 1532, weighted abandonment times for all sales transactions are computed. At block 1534, the transition and abandonment times are classified according to the current goal model. At block 1536, a M/M/s or other Queuing Model is built for the current stage.

At block 1538, the M/M/s Queuing Models for each stage is assembled into a multi-level queuing network.

At block 1540, a M/M/s Queuing Network goal is built using the goal model. At block 1542, Queuing Network 'Previous Data' is built from a previous learned model.

Blocks 1544-1550 are repeated for each learning algorithm, and for 'n' time steps within each learning algorithm. At block 1544, a random sales transaction is selected. At block 1546, if the randomly selected sales transaction fits the selected 'Goal' model, then the 'Goal' model weight is reinforced. At block 1548, if the randomly selected sales transaction fits the selected 'Previous Data' model, then a 'Previous Data' model weight is reinforced. At block 1550, if the randomly selected sales transaction fits the 'Current Data' model, the a 'Current Data' model weight is reinforced.

At block 1552, an aggregate model is formed by combining each level of the 'Goal', 'Previous Data' and 'Current Data' models using the learned weights.

Blocks 1554-1558 may be executed for each sales transaction. If the aggregate model accurately predicts the outcome of the sales transaction (block 1554) and the transaction has a high quality score (block 1556), then a positive metric score is assigned for the transaction (block 1558).

After the sales transactions have been evaluated, a post-HE module may optionally be executed at block 1560.

At block 1562 the learned metric scores are stored in data warehouse 102. At block 1564, the aggregate module is stored as the 'Previous Data' in data warehouse 102.

See Example 3a below for a description of an example application of the Pipeline Analysis method illustrated in FIGS. 15A and 15B.

Figure 16A:
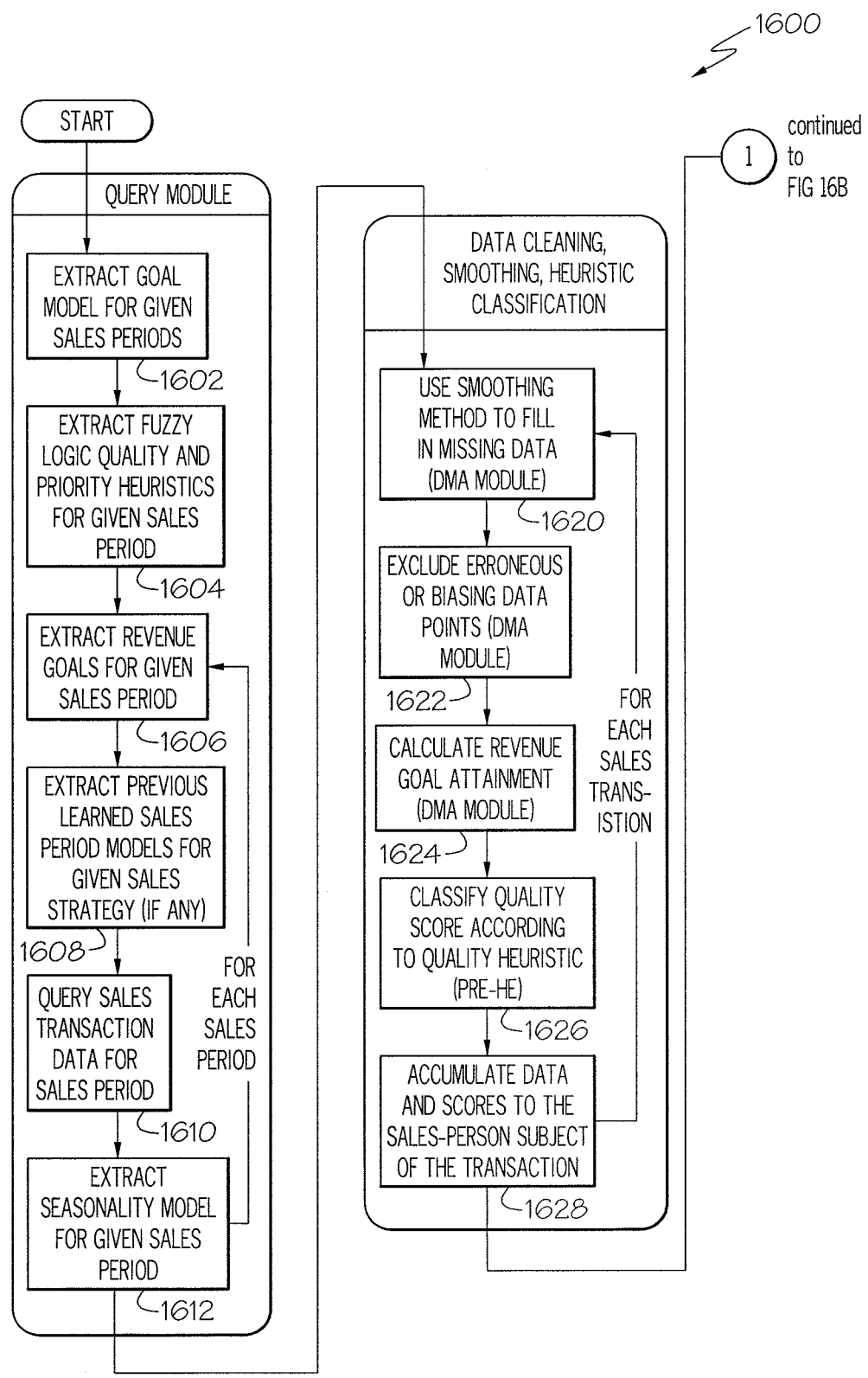
FIG. 16 is a flowchart illustrating a revenue forecasting method according to embodiments of the invention.
Figure 16B:
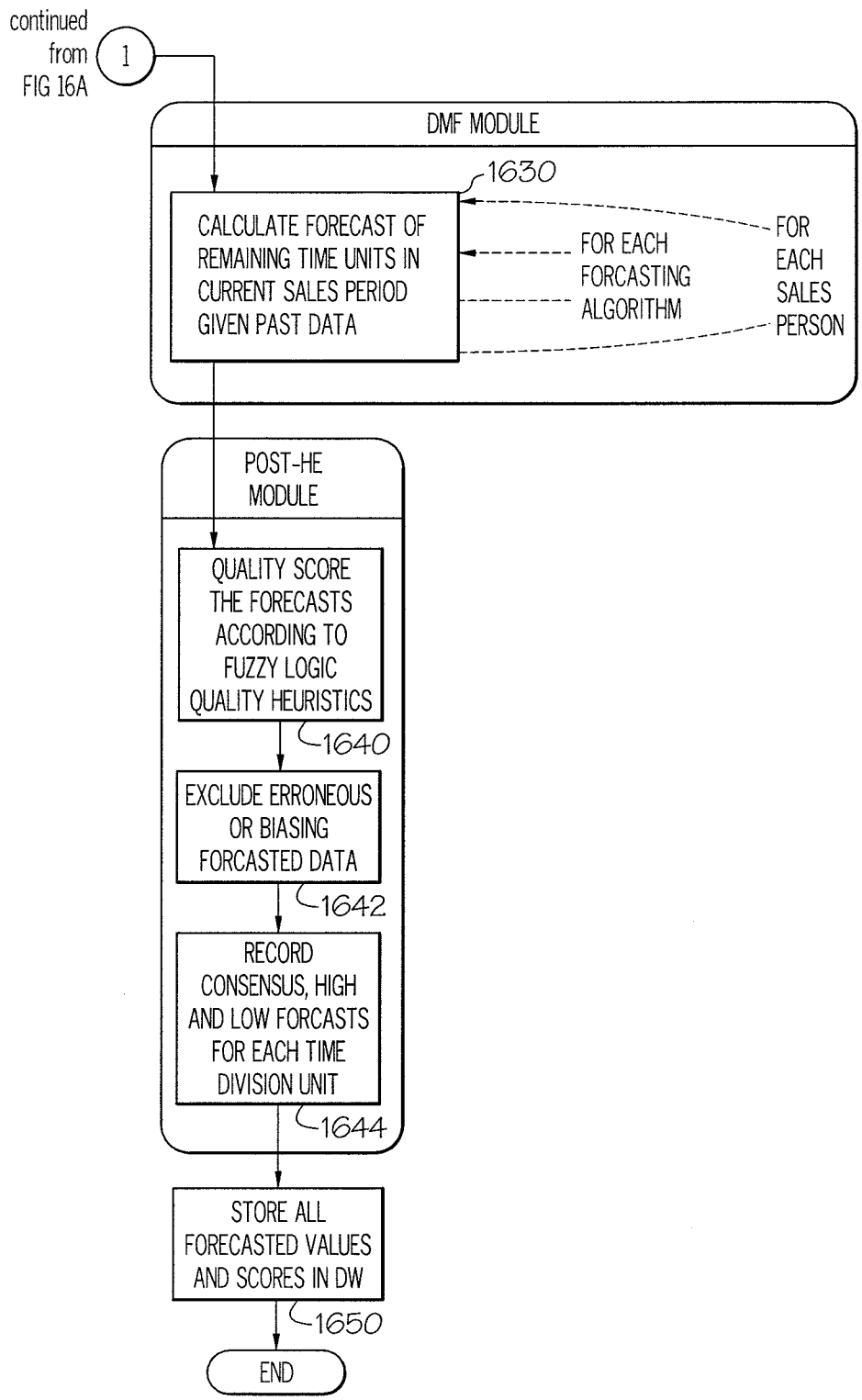

FIG. 16 is a flowchart illustrating a revenue forecasting method according to embodiments of the invention. In some embodiments, a list of sales periods to analyze and a list of sales people to analyze may be supplied as input for the method. A pseudo code description of the method is as follows:

```
Extract 'Goal Model' for given Sales-Periods (block 1602)
Extract Fuzzy Logic Quality and Priority Heuristics for given Sales-Period (block 1604)
For Each Sales-Period (blocks 1606-1612)
        Extract 'Revenue Goals' for given Sales-Period (block 1606)
        Extract previous learned Sales-Period models for given Sales-Strategy, if any. (block 1068)
        Query Sales Transaction Data for Sales-Period {Ongoing, Closed, Lost, Deferred} (block 1610)
        Extract Seasonality Model for given Sales-Period (block 1612)
    For Each Sales Transaction (blocks 1620-1628)
            Use smoothing method to fill in missing data (DMA Module, block 1620)
            Exclude erroneous or biasing data points (DMA Module, block 1622)
            Calculate Revenue Goal Attainment (DMA Module, block 1624)
            Classify Quality Score according to Quality Heuristic (Pre-HE, block 1628)
            Accumulate data and Scores to the sales-person-subject of the transaction (block 1630)
For Each Sales-Person (block 1630)
    For Each Forecasting Algorithm
        Calculate Forecast of remaining time units in current Sales period given past data (Block
1630)
    Quality score the forecasts according to Fuzzy Logic Quality Heuristics (block 1640)
    Exclude erroneous or biasing forecasted data(block 1642)
    Record Consensus, High and Low forecasts for each time-division-unit. (block 1644)
    Store all Forecasted values and Scores in Data Warehouse(block 1650)
```

Figure 17A:
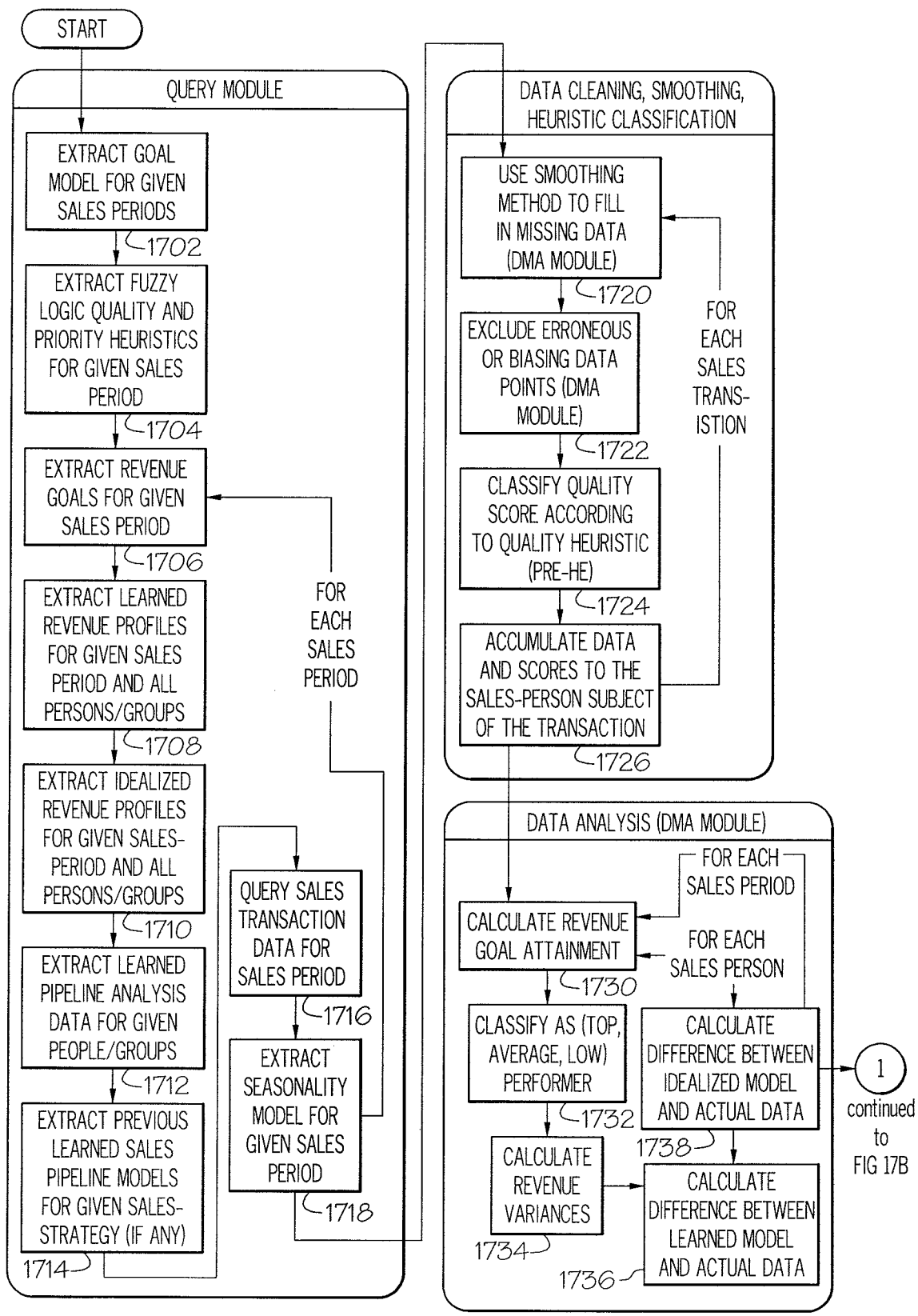
FIGS. 17A and 17B are a flowchart illustrating a method for scoring performance according to embodiments of the invention.
Figure 17B:
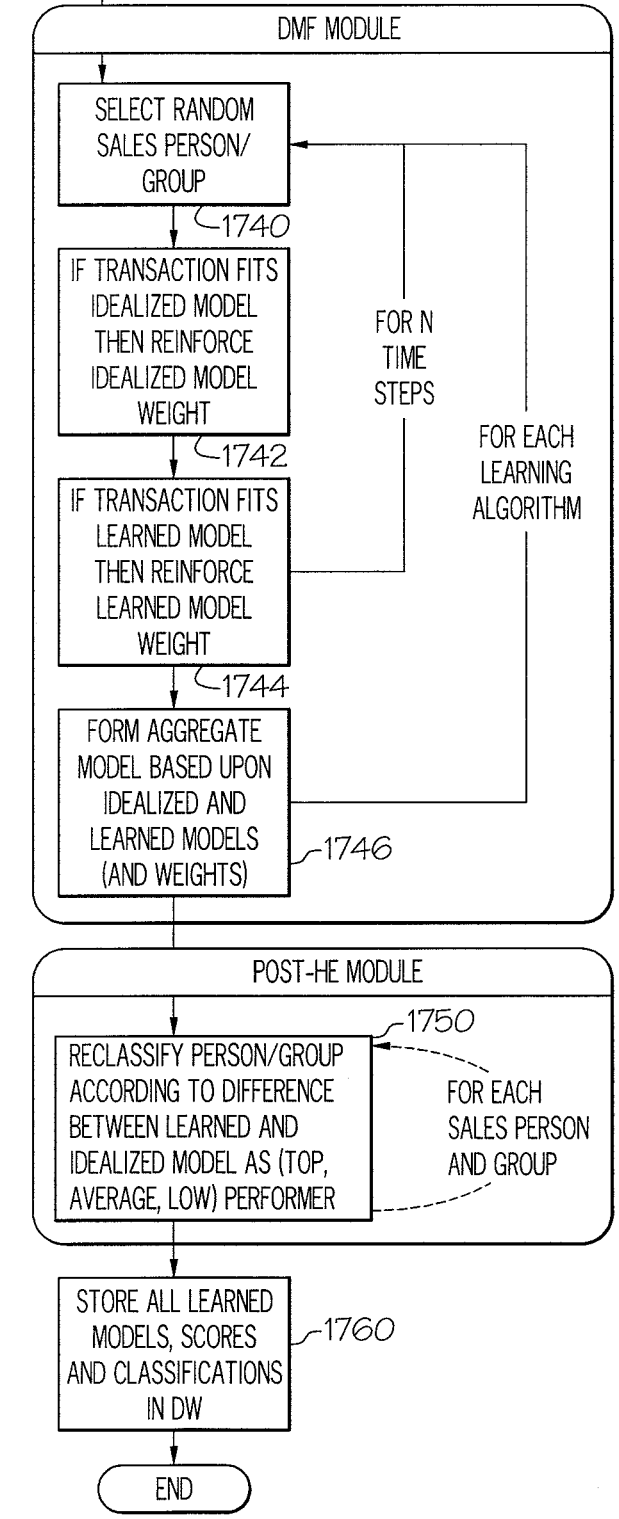
Figure 18:
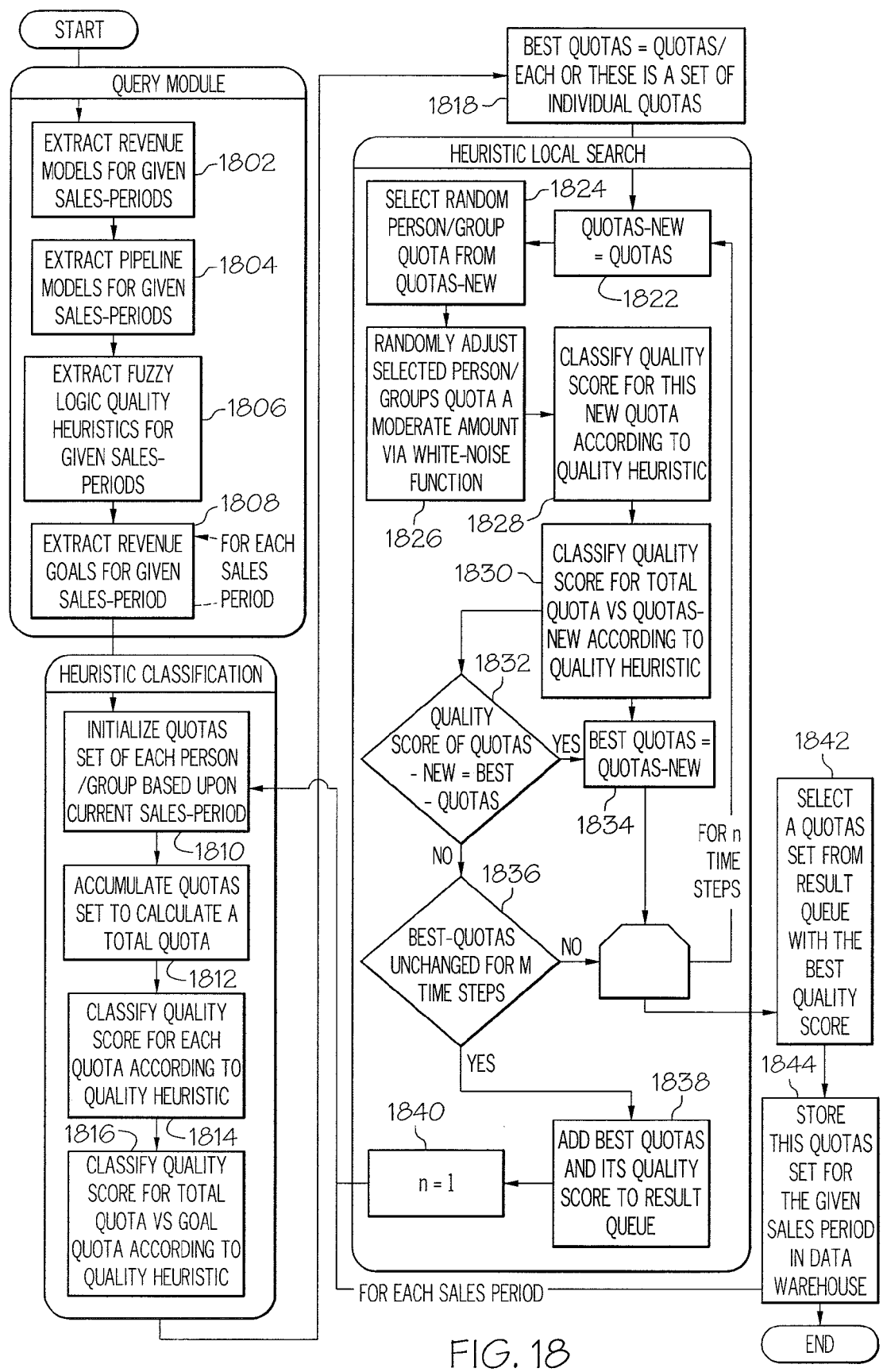
FIG. 18 is a flowchart illustrating a method for allocation of quotas by periods according to embodiments of the invention.

FIGS. 17A and 17B are a flowchart illustrating a method for scoring performance according to embodiments of the invention. A list of sales periods to analyze, a list of sales people to analyze, and/or a list of sales groups to analyze may be provided as input to the method in some embodiments. A pseudo code description of the method is as follows:

FIG. 18 is a flowchart illustrating a method for allocation of quotas by sales periods according to embodiments of the invention. A list of sales periods to analyze, a list of sales people to analyze, and/or a list of sales groups to analyze may be provided as input to the method in some embodiments. A pseudo code description of the method is as follows:

```
Extract 'Goal Model' for given Sales-Periods (Block 1702)
Extract Fuzzy Logic Quality and Priority Heuristics for given Sales-Periods(Block 1704)
For Each Sales-Period (Blocks 1706-1718)
    Extract 'Revenue Goals' for given Sales-Period(Block 1706)
    Extract Learned Revenue Profiles for given Sales-Period and all Persons/Groups(Block 1708)
    Extract Idealized Revenue Profiles for given Sales-Period and all Persons/Groups(Block 1710)
    Extract Learned Pipeline Analysis data for given People/Groups(Block 1712)
    Extract previous learned Sales-Pipeline models for given Sales-Strategy, if any(Block 1714)
    Query Sales Transaction Data for Sales-Period {Ongoing, Closed, Lost, Deferred}(Block 1716)
    Extract Seasonality Model for given Sales-Period(Block 1718)
//Data Cleaning, Data Smoothing and Heuristic Classification
 For Each Sales Transaction (Blocks 1720-1726)
            Use smoothing method to fill in missing data (Block 1720)
            Exclude erroneous or biasing data points (Block 1722)
            Classify Quality Score according to Quality Heuristic (Block 1724)
            Accumulate data and Scores to the sales-person-subject of the transaction (Block 1726)
//Data Analysis (DMA Module)
 For Each Sales-Person (Blocks 1730-1738)
        For Each Sales-Period (Blocks 1730-1738)
            Calculate Revenue Goal Attainment (Block 1730)
            Classify as {Top, Average, Low} Performer (Block 1732)
            Calculate Revenue Variance (Block 1734)
            Calculate difference between Learned Model and Actual data (Block 1736)
            Calculate difference between Idealized Model and Actual data (Block 1738)
//(DMF Module)
For Each Learning Algorithm (Blocks 1740-1746)
     For n time steps (Blocks 1740-144)
        Select Random Sales Person/Group (Block 1740)
        If Transaction Fits Idealized Model Then reinforce Idealized Model weight (Block 1742)
        If Transaction Fits Learned Model Then reinforce Learned Model weight (Block 1744)
    Form Aggregate Model based upon Idealized and Learned Models (and weights) (Block 1746)
//Post-HE module
 For Each Sales-Person and Group
  Reclassify Person/Group according to difference between Learned and Idealized Model as {Top,
        Average, Low} Performer (Block 1750)
 Store all Learned Models, Scores and Classifications in Data Warehouse. (Block 1760)
```

```
1.    // Query Module
2.    Extract Revenue Models for given Sales-Periods (Block 1802)
3.    Extract Pipeline Models for given Sales-Periods (Block 1804)
4.    Extract Fuzzy Logic Quality Heuristics for given Sales-Periods (Block 1806)
5.    For Each Sales-Period
6.        Extract 'Revenue Goals' for given Sales-Period (Block 1808)
7.
8.
9.    For Each Sales Period (Blocks 1810-1844)
10.       // Heuristic Classification
11.       Initialize Quotas Set for Each Person/Group Based upon current Sales Period (Block 1810)
12.       Accumulate Quotas Set to calculate a Total Quota (Block 1812)
13.       Classify Quality Score for each Quota according to Quality Heuristic (Block 1814)
14.       Classify Quality Score for Total Quota vs. Goal Quota according to Quality Heuristic (Block 1816)
15.
16.       Best-Quotas = Quotas //Each of these is a set of individual Quotas (Block 1818)
17.
18.       For n time steps (Blocks 1822-36)
19.           Quotas-New = Quotas (Block 1822)
20.           Select Random Person/Group Quota from Quotas-New (Block 1824)
21.           Randomly adjust selected Person/Groups Quota a moderate amount via White-noise function (Block 1826)
22.           Classify Quality Score for this new Quota according to Quality Heuristic (Block 1828)
23.           Classify Quality Score for Total Quota vs. Quotas-New according to Quality Heuristic (Block 1830)
24.           If Quality Score of Quotas-New ≧ Best-Quotas (Block 1832)
25.               Best-Quotas = Quotas-New (Block 1834)
26.           Else If Best-Quotas is unchanged for m time-steps (Block 1836)
27.               Add Best-Quotas and its Quality Score to Result Queue (Block 1838)
28.               n = 1 (Block 1840)
29.               Goto 11 (go to Block 1810)
30.
31.       Select a Quotas Set from Result Queue with the best Quality Score (Block 1842)
32.       Store this Quotas Set For the given Sales Period in Data Warehouse (Block 1844)
33.
34.   //Quality Score of a Quota is a function of its Forecasted Revenue and Pipeline Performance vs. the
35.   // overall Goals
```

Figure 19:
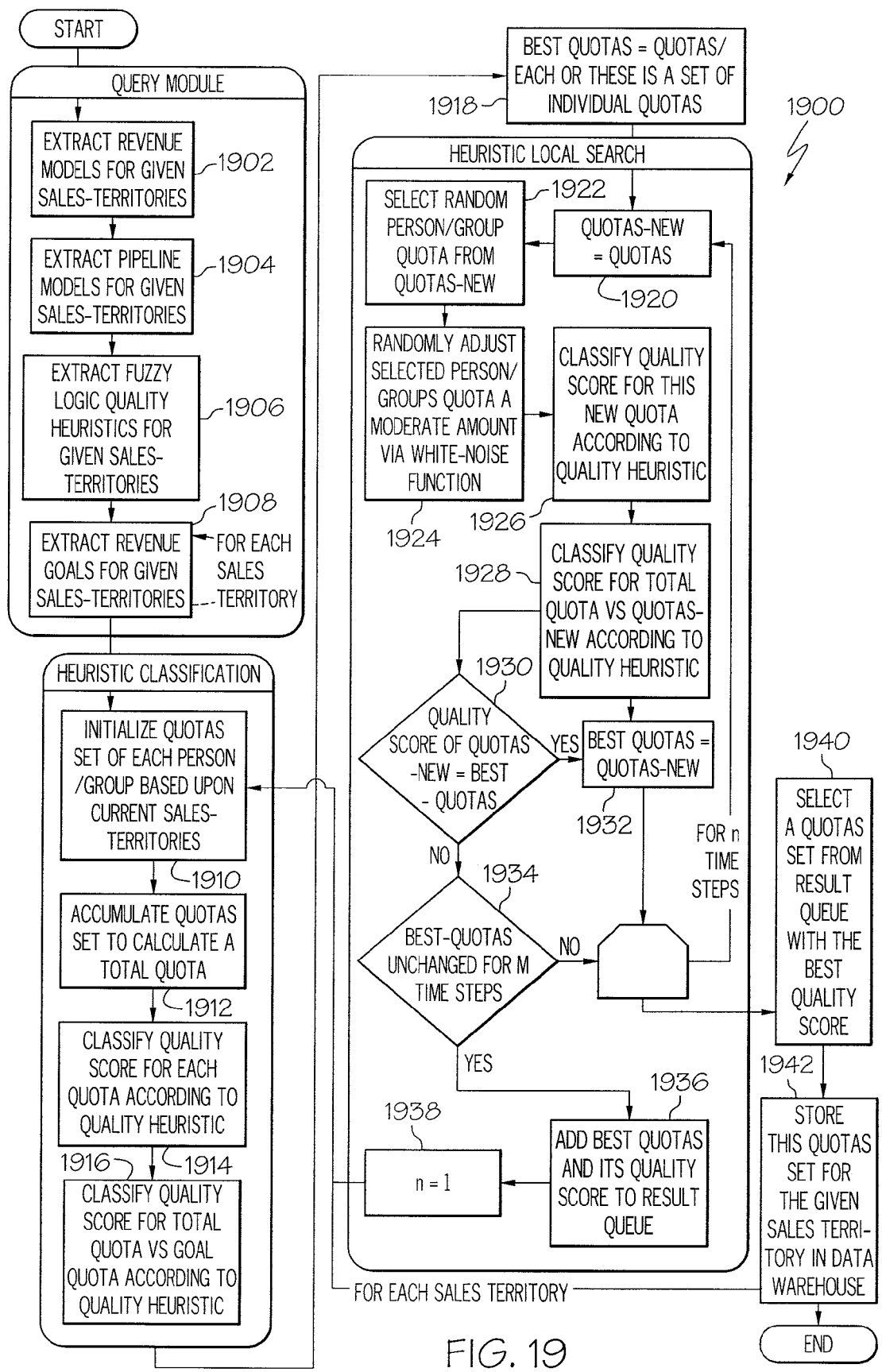
FIG. 19 is a flowchart illustrating a method for allocation of quotas by territories according to embodiments of the invention.

FIG. 19 is a flowchart illustrating a method for allocation of quotas by territories according to embodiments of the invention. A list of sales periods to analyze, a list of sales people to analyze, and/or a list of sales groups to analyze may be provided as input to the method in some embodiments. A pseudo code description of the method is as

```
1.    Extract Revenue Models for given Sales-Territories (Block 1902)
2.    Extract Pipeline Models for given Sales-Territories (Block 1904)
3.    Extract Fuzzy Logic Quality Heuristics for given Sales-Territories (Block 1906)
4.    For Each Sales-Territories
5.        Extract 'Revenue Goals' for given Sales-Territories (Block 1908)
6.
7.
8.    For Each Sales Territories (Blocks 1910-1942)
9.        // Heuristic Classification
10.       Initialize Quotas Set for Each Person/Group Based upon current Sales Territories (Block 1910)
11.       Accumulate Quotas Set to calculate a Total Quota (Block 1912)
12.       Classify Quality Score for each Quota according to Quality Heuristic (Block 1914)
13.       Classify Quality Score for Total Quota vs. Goal Quota according to Quality Heuristic (Block 1916)
14.
15.       Best-Quotas = Quotas //Each of these is a set of individual Quotas (Block 1918)
16.
17.       For n time steps (Blocks 1920-1934)
18.           Quotas-New = Quotas (Block 1920)
19.           Select Random Person/Group Quota from Quotas-New (Block 1922)
20.           Randomly adjust selected Person/Groups Quota a moderate amount via White-noise function (Block 1924)
21.           Classify Quality Score for this new Quota according to Quality Heuristic (Block 1926)
22.           Classify Quality Score for Total Quota vs. Quotas-New according to Quality Heuristic (Block 1928)
23.           If Quality Score of Quotas-New ≧ Best-Quotas (Block 1930)
24.               Best-Quotas = Quotas-New
25.           Else If Best-Quotas is unchanged for m time-steps (Block 1932)
26.               Add Best-Quotas and its Quality Score to Result Queue (Block 1934)
27.               n = 1 (Block 1936)
28.               Goto 11 (go to Block 1910 at Block 1938)
29.
```

| | |
|---|---|
| 30. | Select a Quotas Set from Result Queue with the best Quality Score (Block 1940) |
| 31. | Store this Quotas Set For the given Sales Territories in Data Warehouse (Block 1942) |
| 32. | |
| 33. | //Quality Score of a Quota is a function of its Forecasted Revenue and Pipeline Performance vs. the |
| 34. | // overall Goals |

EXAMPLES

A series of examples illustrating the operation of the above-described systems and methods will now be provided.

Example 1

Forecasting Revenue

Using the data query and display module, sales data is retrieved representing some window-in-time of sales revenue as well as ongoing in-process sales records. From the DW 102 a configuration is retrieved defining the data flow and data transformed to be used. Also from the DW 102 a cache of data from the previous run(s) of the data caching and agglomeration module, metric scores and derived data from previous runs of this module is fetched.

The Data Manipulation Algorithm (DMA) module 402 (FIGS. 4 and 12) is applied to the raw sales data to align it with records from the 'data cache' using data transforms. Supplementary calculations are also made to the metric scores. An example output data stream from the module would be a large list of quantitative data associated with sales-people, sales-periods, products sold and performance metrics for each of these units.

The output of this module is fed to the HE1 404. One example function of the HE1 module 404 is to clean the data of statistical outliers before passing to the DMF module 406. Another example is to create additional quantitative metrics. An example of this is to assign a heuristic category to individual sales people. Sales people who have consistently met or exceeded goals (as defined by evaluating any number of factors) for a large percentage of sales periods would be marked as 'top performers'. People who meet most goals for the same time period would be marked as 'average performers', the rest as 'under-performing'. A third example would flag particular metrics as having an anomaly without necessarily excluding it, such as a sales person who had his or her performance enhanced or degraded by an anomalous event and this should not unduly influence later calculations.

The next sub-module in the chain is the code DMF 406 (FIGS. 4 and 13). This module uses the data and metric stream as an attribute set in the combination of data models with a suite of forecasting algorithms to establish a set of revenue forecasts. An example data model would be a user-entered ideal profile of how a sales person or group's various metrics should be shaped numerically. It may contain various weights for how individual metrics would be used in forecasting algorithms. In addition other parts of the DMF module (FIGS. 4 and 13) could be applied to learn a data model, or profile of how attribute values progress in time associated with performance levels, sales groups and products. This engine also is able to learn new data models with various algorithms by examining previous data in a posteriori plus feedback fashion.

The output of the DMF module 406 flows to the HE2 sub-module 408 (FIGS. 4 and 14). In this scenario HE2 408 would be used to take the suite of revenue forecasts and assign quality scores based upon both user entered heuristics and learned heuristics. This engine also is able to learn new heuristics with various algorithms by examining previous data in a posteriori plus feedback fashion. The final output of the example scenario is a set of revenue forecasts for each person, group and aggregate forecasts for sales. In addition accuracy scores for each forecast, as well as learned data models and heuristics are stored.

Example 2

Scoring the Performance of Sales People and Groups

Similar to Example 1 with the modification that all calculations are done to score the performance of individual people and groups with respect to learned data models of top-performers as well as with respect to user-entered ideal models of performance. An example of this would be an ideal revenue growth of a sales person over time. A second example is a relative analysis of the person's ongoing sales 'pipeline' with respect to learned and ideal models of good performance. In either case the system can learn the historical sales models for an individual or high performing sales representative using any of a variety of machine learning techniques. In addition, an idealized model can be entered by the sales manager. The resulting comparison can aid in the understanding of how individuals relate to one another and to an idealized individual. This helps sales representatives understand their relative performance, and it helps sales managers understand if there is a general deviation between their idealized model and the actual performance of an individual or group.

Example 2 Details: Ideal Revenue Growth or Progression of a Sales Person over Past Time and into the Future.

This analysis occurs in the MLF and DQ-DM Modules. See FIGS. 6 & 7 for diagrammatic details. The method's purpose is to extract raw data and learn a central pattern for revenue progression in time of a sales person or group that is relative to a combination of an idealized pattern and the Revenue Progression pattern of the group of Top Performers.

MLF module operation for Example 2:

The sales data for all persons groups is queried from the 'Sales Records' and from the 'Data Warehouse'. Also from the Data Warehouse the various heuristics are retrieved. The Sales records consist of the 'Closed, Lost and Deferred' Sales Revenue for a range of hierarchical sales periods over the past X periods in time. This data is extracted per person and per group (aggregate). Individuals in the Top-Performer group are included in this query with their membership in this group tagged as such. The following heuristics are retrieved from the DW. Note that these examples are not exhaustive and one of ordinary skill in the art can easily add to this list.

MLF-Module Pre-Heuristic-Engine Examples
(Learned) Sales Revenue Variance: Number of sales periods where the revenue variance of an individual customer (or class or group of customers) have variance below some percentage threshold. Variance is the percentage drop or gain compared to last period.

(Idealized) Sales Revenue Variance Profile:
  The ideal profile of revenue variance. This is characterized by a range of growth or decrease percentages period-over-period. An example would be that ideal growth or expected decrease in sales period-over-period should vary between −10% and +15% in the $3^{rd}$ month of a given year vs. the $2^{nd}$ month.
(Learned) Sales Revenue Profile of Top Performers:
  Form an aggregate profile of the progression of the revenue profile for all 'Top Performers'. This profile would be normalized to be a numerical curve of percentage increases starting from the initial revenue goal of the starting sales period of the analysis. The profile would be weighted by the overall 'performance score' of the individual. The basic computation is a smoothed weighted average using any combination of classical methods (iterative exponential smoothing) or newer time-series analysis methods with or without seasonality adjustments.
(Learned) Sales Revenue Profile of Sales Group:
  Same as the previous analysis but using the subject-salesperson's peer-group.
(Learned) Sales Revenue Profile of Sales Person:
  Same as previous analysis except done for each individual in isolation.
(Idealized) Sales Revenue Profile:
  This is an idealized profile established & input by sales managers or executives that gives an ideal average and spread of a revenue curve over time.
Main DMF module details:
In this step previous learned profiles and new sales records are used to learn updated profiles. This may be accomplished by running a suite of classical forecasting methods, time series analysis methods, smoothing methods and seasonality adjustments. The outputs of the individual analysis methods are aggregated via a weighted scheme. Note that the weights of each method are learned as well. After a run is performed and forecasts are stored, they are used in the next run and compared to the actual reported revenue gained, lost, or otherwise deferred. The aggregation weights of the different methods are adjusted based upon the success or failure of the particular method's predicted data vs. actual data.

The output of the DMF module (FIG. 13) is processed by the MLF Post-Heuristics engine 408 (FIG. 14). Here each learned profile is given a quality score that is a function of the accuracy of the predictions from the DMF module and it's similarity to the idealized models. In particular embodiments, the heuristic analysis is a set of fuzzy logic rules.

Figure 10:
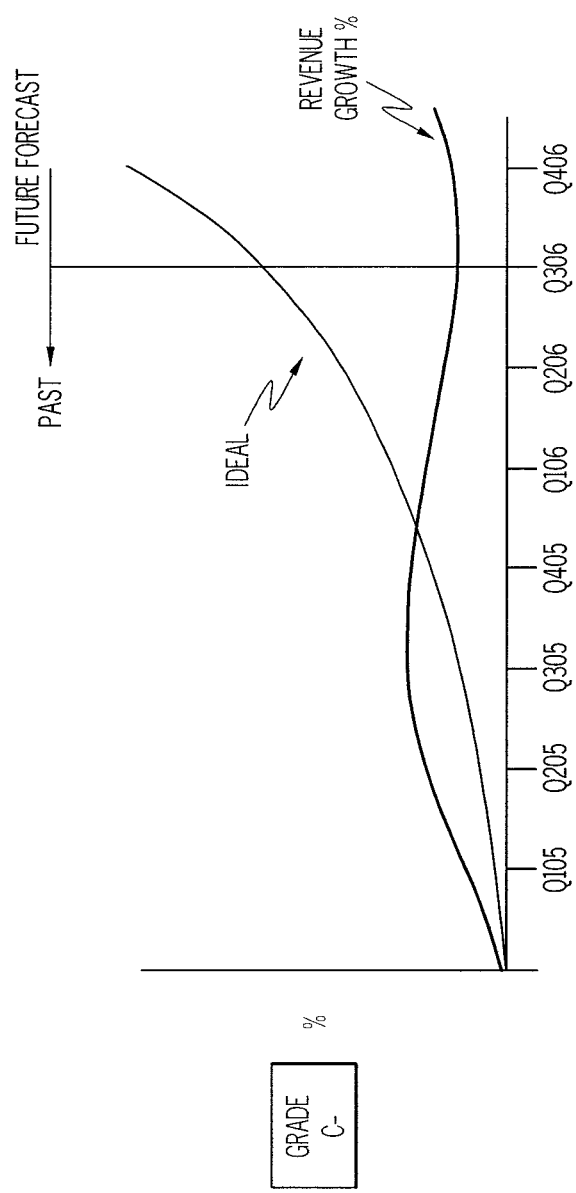
FIG. 10 is an illustration of the graphical output of Ideal Revenue Growth Analysis.

Output of MLF module:
Quality score for each person or group
Updated 'Learned' profiles.
Updated metadata for Idealized model-profiles.
DQ-DM Module for Example 2:
  Given a 'subject' (sales representative or group) of analysis, the following is performed to display to the user a graded analysis of the subject's revenue growth or progression. See FIGS. 7 and 10.
  From the DW the following can be retrieved:
  Run-Time profile comparison and analysis methods
  Learned Revenue Profile for the Subject
  Learned Revenue Profile for the Subject's Group
  Learned Revenue Profile for the Top Performers
  Idealized Revenue Profile.
  Learned Revenue Variance Profile for the Subject
  Learned Revenue Variance Profile for the Subject's Group
  Learned Revenue Variance Profile for the Top Performers
  Idealized Revenue Variance Profile.
  The run-time heuristics are performed on the above data. The Heuristics produce two types of output, comparative grading and absolute grading. The comparative grading assigns a quality score for the subjects profile relative to a comparison-group. Typically this is the subjects peer group in the organization and the group of top-performers. The absolute grading is similar except that a score is assigned assessing how well the subjects profile fits the idealized profiles. FIG. 10 has an example chart and assigned grade for an absolute revenue trend and profile analysis. One of average skill in the art can easily see other variations of this example.

Example 3

Scoring Sales Processes

Similar to examples 1 & 2. The module is applied to the problem of evaluating an entire sales processor sales methodology with respect to the ideal model of the process as well as compared to other good performing processes or methodologies. Note that this analysis can be independent of individuals looking at the process in isolation. It can also be used to identify weak individuals or groups that bring the overall performance of the process or methodology down. The novelty of this approach is it's usage in CRM software applied to sales process analysis and its combination with iterative machine learning methods.

Example 3a

Ideal Pipeline Analysis of Sales Pipeline & Strategy

Background for Example 3a:
A sales pipeline is an abstract construct consisting of series of 'stages'. At each stage a set of tasks is to be performed by the sales representative. For example, stage 1 might be called 'Leads' where potential deals are placed in this first stage upon initial contact with the sales representative. To progress to Stage 2 ('Demo Product') the deal's primary contact must exchange preliminary information with the sales representative and agree to schedule a product demonstration. Stage 7, for example, could be the 'Negotiation' phase where representative and client agree to financial terms of a deal. The Set of stages is generally referred to as a Sales Strategy. Representatives may be working on potential clients using a plurality of Sales Strategies.

The active deals of a given representative can be assigned to a stage in a particular strategy. A representative's 'raw pipeline' is a set of monetary values that are the sum of the assumed value potential deals in a given stage. A representative's 'forecasted pipeline' is a set of values as above except that each stage is assigned a conversion rate percentage. The raw values in each stage are multiplied by the conversion rate percentage to form a set of monetary values that a representative terms his or her expected forecast. Ordinarily these percentages are manually assigned by users.

Sales Strategy and Pipeline Analysis 'Learning Method':
Various data is requested from the DW 102 and Sales Records 112. A representative outline of this data is shown below:
  Closed or Lost or Deferred Revenue History
  Date and time of each stage transition for all deals
  Sales Process stages and stage-forecast-percentages
  Sales Goals
  Ongoing Active Deals
  Quality Heuristics
    Revenue Model (see Example 2)
    Strategy Quality Rules
    Data Cleaning Procedures The data above is loaded and a set of algorithms is applied to them to extract statistical information on the stage transition timings, stage abandonment rates (lost deals) and deferred or backward stage moves. All sales strategies are modeled with a multi-level queuing model such as M/M/s queuing network (for further details, see *An Introduction to Stochastic Modeling*, by Samuel Karlin, Howard M. Taylor, Academic Press, 3 edition (February 1998), which is hereby incorporated by reference herein for all purposes).

This analysis allows the predictive modeling of the sales strategy and compares it to the user entered expected conversion rates from one stage to the next. This analysis also allows the modeling of how changing human resources allocated to specific stage will affect the behavior of the strategy as a whole.

This queuing network method is combined with a set of fuzzy logic rule sets, for example, that classify deals based upon their characteristics. Specifically the attributes of a deal are used to perform a supervised machine learning algorithm based upon the outputs of the queuing model and the system learns a classification system for assigning quality scores to deals. These scores are used to prioritize attention to deals of various types. Deals that the classifier system and queuing model predict will transition quickly between stages are given an increased 'forecast percentage'. While deals with some attribute that the ML algorithm has identified as correlated with slow progress will be assigned a lower forecast percentage.

Note also that this analysis allows prediction of deal close times and assigning scoring metrics to individual sales representatives and groups based upon how a particular deal is progressing (for example—being 2 days past typical transition times in stage 2 indicates that the predicted close date will be 10 days behind typical). Another algorithm in this suite is the forecasting, smoothing and time series analysis algorithms mentioned in example 2. Here these techniques can be used to both repair missing data and to provide compatible sales strategy forecasts for comparative analysis and decisioning. It is also used to provide seasonality adjustments to the output of the queuing network.

This system can be run at a frequency relevant to the typical business cycle of a sales strategy. For example, if a typical deal is closed in 30 days and some component of a deal is likely to change every day, then the system would be run at least twice a day. The data and models built from the last run are loaded and their predictions checked. The various quality weights on the output of each algorithm are adjusted by a reinforcement learning algorithm.

Figure 9:
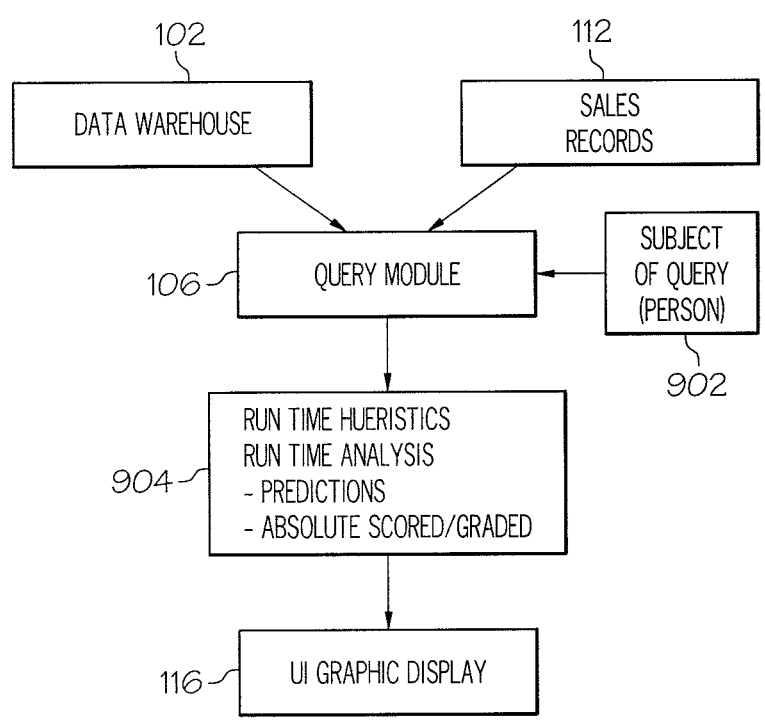
FIG. 9 is an illustration of Query, Analytic Comparison and display method.
Figure 11:
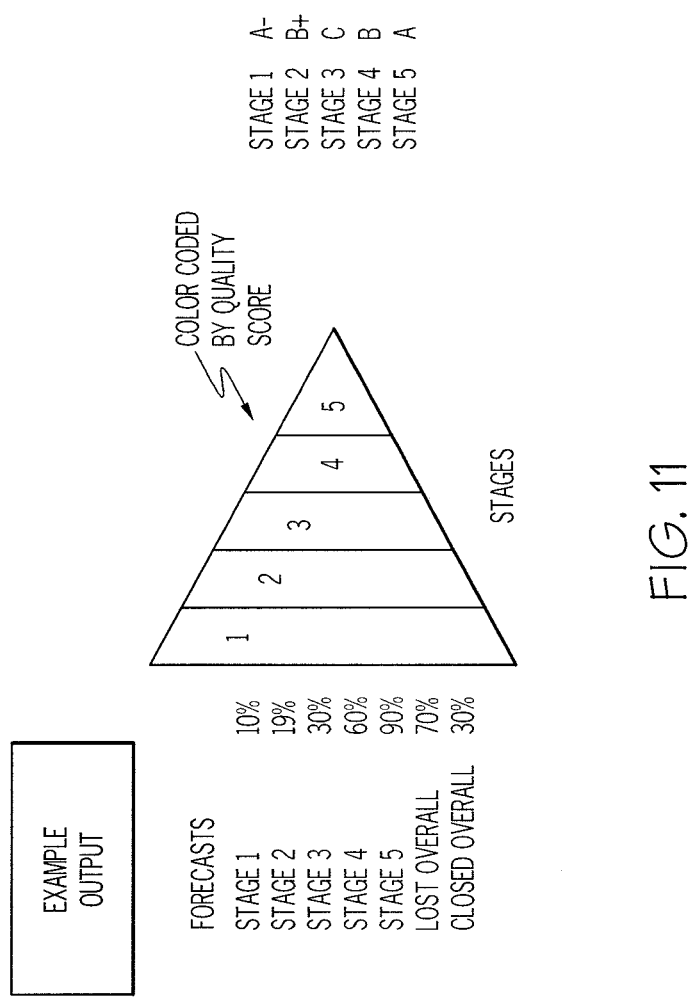
FIG. 11 is an illustration of the graphical output of Ideal Pipeline or Strategy Analysis.

Sales Strategy and Pipeline Analysis 'Query, Analytic Comparison and Display Method':

FIG. 9 is an illustration of this process. It is similar to FIG. 7. The aggregate outputs of the MLF module for this task are loaded along with the subject sales process. An example output is given on FIG. 11.

The basic method is shared with Example 2's DQ-DM section along with FIG. 7.

This following data can be loaded:
From the DW the following can be retrieved:
Run-Time profile of the current sales strategy.
Learned forecast stage percentages
Quality Metrics for poor, average and excellent performing deals
Seasonality Model
Data associated with the subject sales strategy
Sales records for open deals within this strategy
The output of this model is an aggregated summary of the open deals in the current sales period for a given sales period.

Each stage in the strategy is assigned a score for overall execution and a forecasted overall conversion rate. FIG. 15 described above provides an example algorithm that details how the modules interact with each other to provide this (Example 3a) analysis.

Example 3b

Ideal Pipeline Analysis of Sales Representative or Group

Sales Strategy and Pipeline Analysis 'Learning Method':
Example 3b is similar to Example 3a, except that the analysis is done for a specific sales representative or group across the range of sales strategies they work on.
Sales Strategy or Pipeline Analysis 'Query, Analytic Comparison and Display Method':
See Example 3a except that this analysis is done for a specific sales representative or group across the range of sales strategies they work on.

Example 4

Allocation of Quotas

The system can be used to allocate or re-allocate sales goals or quotas. Using a suite of machine learning or optimization algorithm one can learn optimal allocation of quotas such that some fitness function can be maximized. The fitness function would be comprised of a weighted sum of factors and use the outputs of Example 2a as primary inputs to the fitness function to reallocate quotas.

Example 5

Allocation of Territories

The system can be used to allocate or re-allocate sales territories. For example, using a suite of machine learning or optimization algorithm one can learn optimal allocation of quotas such that some fitness function is maximized. The fitness function may be comprised of a weighted sum of factors and use the outputs of Example 2a as primary inputs to the fitness function to reallocate territories.

The FP module 10 as supported by the DW 102 allows sales people to execute 'what if' scenarios for planning various organization attributes for the future. The basic idea is to solve (by isolated analysis, approximation, or by a direct technique) (in spirit, not necessarily literal solving) for a particular variable. In basic algebra when one solves equations(s), some number of variables are chosen as 'unknown' while the rest of the variables that are known are used to identify values and ranges of values for the unknown variables that fulfill the equations.

The input to the FP 110 can be made up of the raw sales record data 112 as well as the DW 102 using all previously mentioned elements and an additional 'scenarios' element. The processing sub-modules are the MLF 108, a scenario analysis engine (SAE) 502 and a display and user interface element 504. A display and user interface components allow the user to see the output of the FP 110 as well as interact with some number of quantitative attributes. Additionally, the SAE 502 may contain specific processes as described herein.

The display 504 and user interface element 116 can communicate bi-directionally with the SAE 502 & MLF 108. The FP 110 can also store scenarios that users have created during the use of the FP 110. One purpose of the SAE 502 and MLF 108 is to use 'conditional' data to create new MLF analysis outputs given this conditional data. The outputs, conditional data, and associated elements of the DW 102 are termed a 'scenario' and also stored in an area of the DW 102. The scenario engine 502 contains a number of algorithms as described herein.

Example 6

Goal Based Revenue Planning

A manager has in mind a particular goal for a given metric, in this case goal-revenue for some number of time periods into the future. However, after looking at revenue forecasts from the MLF it is apparent that revenue forecasts are short of the goal. At this point a manager has a number of business factors that can be adjusted. Sales people's individual goals can be altered, product pricing can be adjusted and new sales people can be hired. As an example, a manager may use the system to determine which of these factors should be altered to best meet the desired goal.

For example, using the FP 110, a manager can input the desired goal-revenue and look at how factors can be altered to meet this goal. Taking one factor, as an example the individual revenue goals, the system can be asked to meet the new revenue goal by assigning new individual goals. The output here would be a breakdown of goal changes, as well as a likelihood score of the users meeting the new goals given past history and current status. It would also output an overall likelihood score of meeting the new goal-revenue.

Example 7

Hiring and Firing of Individuals

Building on Example 1 of the FP 110, the manger can also attempt to meet some new goal by examining the effect of hiring additional individuals plus firing and/or replacing existing individuals. The manger is presented with a list of individuals, their past metrics, future goals and future forecasts. Each individual is also assigned various performance scores. The manger can in the simplest case eliminate individuals from the list and look at the effect on the future goals, forecasts and likelihood numbers. Another action would be to add an individual to the list of some performance level, presumable either 'average' or 'top' and look at the effect on forecasts, likelihood and goals. The third action would be the combination of the two, replacing an individual with a new individual.

A slightly more complex embodiment is to set up a schedule of hiring of new people at a given performance level to see how the forecasts are effected over longer time scales. This staged hiring model would benefit from the accurate historical models of how long it took existing sales people to come up to their current level of performance and similarly indicate the growth rate for individual performance as they learn the particulars of the current product and sales environment.

An embodiment of the heuristics would be both simple rule-sets as well as fuzzy rule sets to assign grades or scores to individual metrics. An embodiment of a data-model is a set of values describing how given metrics change over some other variable (an example would be a metric over time).

Thus as is evident from the above, the various embodiments may provide a Revenue Forecasting system to learn to forecast revenue as a combination of standard approaches as well as ones based upon learning a profile of the members of the organization and their historical attributes, performance classification etc.

Further, the various embodiments may provide for scoring the performance of Sales People and Groups, including:
  Scoring a person/groups learned profile against known-good profiles and entered ideal-profiles. Give detailed breakdown of areas of difference
  Scoring projected revenues vs. goals Still further, the various embodiments may provide analysis of performance of Sales Strategy vs. Ideal/Goal, including:
  Learning/building a model of Strategy-Pipeline based upon real data
  Comparing to Idealized model of Strategy-Pipeline
  Allowing prediction of pipeline throughput per person group and as a whole
  Providing real-time scores per person group of deviation from Ideal Yet further, the various embodiments provide the ability to perform Future Planning and What-If Scenarios, including:
  Goal based Revenue Planning
  Given learned profiles of individuals and processes what is the likelihood of meeting a particular Revenue Goal?
  Breakdown reallocation of Quota increases based upon above learned profiles
  Breakdown reallocation of Territories based upon above learned profiles
  Hiring/Firing Planning—Similar to above with the addition of allowing user to ask the system to evaluate the effect of adding new people, replacing people, firing people and its effect on future revenue and sales strategy performance The various sales performance and forecasting system examples shown above illustrate a novel predictive and profile learning sales automation analytics system. A user of the present invention may choose any of the above sales performance and forecasting system embodiments, or an equivalent thereof, depending upon the desired application. In this regard, it is recognized that various forms of the subject invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention. Therefore, it is manifestly intended that this inventive subject matter be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A computer readable storage medium having stored thereon executable program code for a sale automation method, where when the program code is executed by a processor is operable to perform said method comprising:
  providing a central repository of machine learned and top performer sales data profiles and a repository of raw sales data;
  extracting raw sales data from the repository of raw sale data;

extracting machine learned and top performer sales data profiles from the central repository;

machine learning central sales data patterns based on a forecasting formulation of raw historical sales models, the forecasting of raw historical sales models based on raw sales data, wherein machine learning central sales data patterns comprises calculating a revenue goal attainment for a sales person during a sales period, classifying performance of the sales person based on the calculated revenue goal attainment, calculating a revenue variance for the sales person during the sales period, calculating a difference between the extracted learned sales pipeline models and sales transaction data for the sales person during the sales period, calculating a difference between an idealized model and the sales transaction data for the sales person during the sales period, and repeating said machine learning central sales data patterns for each sales period and for each sales person;

machine learning new sale data profiles based on a formulation of learned sales models, the formulation of learned sales models based on machine learned and top performer data profiles, wherein machine learning new sales data profiles comprises selecting a random sales person, comparing transaction data for the random sales person to learned sales pipeline models and the idealized model, reinforcing the idealized model when the transaction data for the random sales person fits the idealized model, and reinforcing the learned sales pipeline models when the transaction data for the random sales person fits the learned sales pipeline models, and repeating said machine learning new sales data profiles for each learning algorithm and each time step;

storing the new sales data profiles and central sales data patterns to the central repository; and scoring performance of central sales data patterns based on the machine learned new sales data profiles.

2. The computer readable storage medium as recited in claim 1 wherein said method further comprises:

extracting heuristics from the central repository; and learning the new sales data profile and central sales data patterns based on the extracted heuristics.

3. The computer readable storage medium as recited in claim 2 where scoring performance comprises:

assigning a quality score based on comparative grading of new sales data profiles relative to machine learned and top performer data profiles; and assigning an absolute grading relative to new sales data profiles based on ideal sales data.

4. The computer readable storage medium as recited in claim 1 wherein the learning step is performed using one of a machine learning approach, a reinforcement learning approach, a fuzzy logic approach, or a M/M/s queuing network approach.

5. The computer readable storage medium as recited in claim 1, wherein extracting raw sales data and machine learned and top performer sales data profiles comprises:

extracting revenue goals for sales period;
extracting learned revenue profiles for the sales period;
extracting idealized revenue profiles for the sales period;
extracting learned pipeline analysis data;
extracting learned sales pipeline models for a sales strategy;
querying sales transaction data for the sales period; and
extracting a seasonality model for the sales period.

6. The computer readable storage medium as recited in claim 5, further comprising:

using a smoothing method on the extracted data;
excluding erroneous or biased data points from the smoothed extracted data;
classifying a quality score for each sales transaction based on a quality heuristic; and
accumulating data and scores to a sales person subject of each transaction.

7. A method for sales automation comprising:

providing a central repository of machine learned and top performer sales data profiles and a repository of raw sales data;

extracting raw sales data from the repository of raw sale data;

extracting machine learned and top performer sales data profiles from the central repository;

machine learning, by a processor, central sales data patterns based on a forecasting formulation of raw historical sales models, the forecasting of raw historical sales models based on raw sales data, wherein machine learning central sales data patterns comprises calculating a revenue goal attainment for a sales person during a sales period, classifying performance of the sales person based on the calculated revenue goal attainment, calculating a revenue variance for the sales person during the sales period, calculating a difference between the extracted learned sales pipeline models and sales transaction data for the sales person during the sales period, calculating a difference between an idealized model and the sales transaction data for the sales person during the sales period, and repeating said machine learning central sales data patterns for each sales period and for each sales person;

machine learning new sale data profiles based on a formulation of learned sales models, the formulation of learned sales models based on machine learned and top performer data profiles, wherein machine learning new sales data profiles comprises selecting a random sales person, comparing transaction data for the random sales person to learned sales pipeline models and the idealized model, reinforcing the idealized model when the transaction data for the random sales person fits the idealized model, and reinforcing the learned sales pipeline models when the transaction data for the random sales person fits the learned sales pipeline models, and repeating said machine learning new sales data profiles for each learning algorithm and each time step;

storing the new sales data profiles and central sales data patterns to the central repository; and scoring performance of central sales data patterns based on the machine learned new sales data profiles.

8. The method as recited in claim 7 wherein said method further comprises:

extracting heuristics from the central repository; and learning the new sales data profile and central sales data patterns based on the extracted heuristics.

9. The method as recited in claim 8 where scoring performance comprises:

assigning a quality score based on comparative grading of new sales data profiles relative to machine learned and top performer data profiles; and assigning an absolute grading relative to new sales data profiles based on ideal sales data.

10. The method as recited in claim 7 wherein the learning step is performed using one of a machine learning approach, a reinforcement learning approach, a fuzzy logic approach, or a M/M/s queuing network approach.

11. The method as recited in claim 7, wherein extracting raw sales data and machine learned and top performer sales data profiles comprises:
 extracting revenue goals for sales period;
 extracting learned revenue profiles for the sales period;
 extracting idealized revenue profiles for the sales period;
 extracting learned pipeline analysis data;
 extracting learned sales pipeline models for a sales strategy;
 querying sales transaction data for the sales period; and
 extracting a seasonality model for the sales period.

12. The method as recited in claim 11, further comprising:
 using a smoothing method on the extracted data;
 excluding erroneous or biased data points from the smoothed extracted data;
 classifying a quality score for each sales transaction based on a quality heuristic; and
 accumulating data and scores to a sales person subject of each transaction.

13. A system comprising:
 a processor; and
 a memory coupled with and readable by the processor and storing a set of instructions which, when executed by the processor, cause the processor to automate sales by:
 providing a central repository of machine learned and top performer sales data profiles and a repository of raw sales data;
 extracting raw sales data from the repository of raw sale data;
 extracting machine learned and top performer sales data profiles from the central repository;
 machine learning central sales data patterns based on a forecasting formulation of raw historical sales models, the forecasting of raw historical sales models based on raw sales data, wherein machine learning central sales data patterns comprises calculating a revenue goal attainment for a sales person during a sales period, classifying performance of the sales person based on the calculated revenue goal attainment, calculating a revenue variance for the sales person during the sales period, calculating a difference between the extracted learned sales pipeline models and sales transaction data for the sales person during the sales period, calculating a difference between an idealized model and the sales transaction data for the sales person during the sales period, and repeating said machine learning central sales data patterns for each sales period and for each sales person;
 machine learning new sale data profiles based on a formulation of learned sales models, the formulation of learned sales models based on machine learned and top performer data profiles, wherein machine learning new sales data profiles comprises selecting a random sales person, comparing transaction data for the random sales person to learned sales pipeline models and the idealized model, reinforcing the idealized model when the transaction data for the random sales person fits the idealized model, and reinforcing the learned sales pipeline models when the transaction data for the random sales person fits the learned sales pipeline models, and repeating said machine learning new sales data profiles for each learning algorithm and each time step;
 storing the new sales data profiles and central sales data patterns to the central repository; and
 scoring performance of central sales data patterns based on the machine learned new sales data profiles.

14. The system as recited in claim 13 wherein said method further comprises:
 extracting heuristics from the central repository; and
 learning the new sales data profile and central sales data patterns based on the extracted heuristics.

15. The system as recited in claim 14 where scoring performance comprises:
 assigning a quality score based on comparative grading of new sales data profiles relative to machine learned and top performer data profiles; and
 assigning an absolute grading relative to new sales data profiles based on ideal sales data.

16. The system as recited in claim 13 wherein the learning step is performed using one of a machine learning approach, a reinforcement learning approach, a fuzzy logic approach, or a M/M/s queuing network approach.

17. The system as recited in claim 13, wherein extracting raw sales data and machine learned and top performer sales data profiles comprises:
 extracting revenue goals for sales period;
 extracting learned revenue profiles for the sales period;
 extracting idealized revenue profiles for the sales period;
 extracting learned pipeline analysis data;
 extracting learned sales pipeline models for a sales strategy;
 querying sales transaction data for the sales period; and
 extracting a seasonality model for the sales period.

18. The system as recited in claim 17, further comprising:
 using a smoothing method on the extracted data;
 excluding erroneous or biased data points from the smoothed extracted data;
 classifying a quality score for each sales transaction based on a quality heuristic; and
 accumulating data and scores to a sales person subject of each transaction.

* * * * *